United States Patent [19]

Chapman et al.

[11] Patent Number: 5,255,181
[45] Date of Patent: Oct. 19, 1993

[54] METHOD OF PLANNING ORGANIZATIONAL ACTIVITIES

[75] Inventors: William Chapman, Scottsdale; William Capen, Phoenix; Gwo-Jer Chang; Christopher Handorf, both of Mesa; Anant Raman, Chandler; Ajay Sevak, Tempe; Kolur Venkatesh, Chandler, all of Ariz.

[73] Assignee: Motorola, Inc., Schaumburg, Ill.

[21] Appl. No.: 532,306

[22] Filed: Jun. 1, 1990

[51] Int. Cl.[5] .................. G06F 15/22; G06F 15/24; G06G 7/52
[52] U.S. Cl. ................................ 364/401; 364/468
[58] Field of Search ......................... 364/401, 468

[56] References Cited

U.S. PATENT DOCUMENTS

| | | | |
|---|---|---|---|
| 3,703,725 | 11/1972 | Gomersall et al. | 444/1 |
| 3,845,286 | 10/1974 | Aronstein et al. | 235/151.1 |
| 4,208,712 | 6/1980 | Deutsch | 364/105 |
| 4,517,375 | 5/1985 | Cassell | 364/138 |
| 4,591,983 | 5/1986 | Bennett et al. | |
| 4,628,434 | 12/1986 | Tashiro et al. | 364/130 |
| 4,635,182 | 1/1987 | Hintz | 364/138 |
| 4,648,023 | 3/1987 | Powell | 364/156 |
| 4,670,848 | 6/1987 | Schramm | 364/513 |
| 4,697,242 | 9/1987 | Holland et al. | 364/513 |
| 4,807,108 | 2/1989 | Ben-Arieh et al. | 364/148 |
| 4,827,423 | 5/1989 | Beasley et al. | 364/468 |
| 4,896,269 | 1/1990 | Tong | 364/468 |
| 5,111,404 | 5/1992 | Kotani | 364/468 |

OTHER PUBLICATIONS

Chapman, "Manufacturing Control and Capacity Planning", 1987, Intl. Electronic Manufacturing Tech. Symposium.

Primary Examiner—Roy N. Envall, Jr.
Assistant Examiner—Ari M. Bai
Attorney, Agent, or Firm—Joe E. Barbee

[57] ABSTRACT

A method for translating complex process flow networks into plans or schedules for the manufacturing of products or the performance of other organizational activities is disclosed. The method maintains a time-valued list of existing commitments to resources. Allocations of these resources are made to lots during a simulation procedure which calculates a resulting plan's timing data. The method simulates higher priority lots before it simulates lower priority lots. A simulation evaluates the process flow description to obtain the relative order of consuming and releasing resources, resource attributes and related capabilities, initial minimum timing requests, and process control rules. The simulation uses the list to determine when resources may be used without impacting prior commitments of the resources. In addition, the simulation forces the allocations to conform to the process control rules. The resulting timing data is merged into the processing plan, and resource commitments are then made to the simulated resource. When lower priority lots are simulated, commitments have already been made to higher priority lots. Thus, the lower priority lots cannot receive resource allocations which impact the higher priority lots. However, the lower priority lots may receive allocations which occur prior to contending allocations to higher priority lots.

18 Claims, 14 Drawing Sheets

METHOD OF PLANNING ORGANIZATIONAL ACTIVITIES

RELATED INVENTIONS

The present invention is related to the following, all of which are assigned to the assignee of the present invention:
1. U.S. Patent Application Ser. No. 342,774, filed Apr. 25, 1989, and now U.S. Pat. No. 5,128,860 entitled "Mean and Method for Managing Manufacturing or Other Resources," by William M. Chapman.
2. "Manufacturing Control and Capacity Planning System", filed on even date herewith, by William M. Chapman.
3. "Process Flow Information Management System" filed on even date herewith, by William M. Chapman, et al.
4. "Method of Controlling the Execution of Organizational Plans," filed on even date herewith, by William M. Chapman, et al.
5. "Resource-Lot Association Coordinator," filed on even date herewith, by William M. Chapman, et al.

Each of the above-listed applications is incorporated herein by reference.

BACKGROUND OF THE INVENTION

1. Technical Field

The present invention relates generally to manufacturing and other organizational activities in which a multiplicity of tasks are simultaneously balanced against one another to achieve goals of the organization. More specifically, the present invention relates to a system for allocating resources to lots to optimize organizational efficiency.

2. Background Art

A manufacturer who applies a variety of resources to produce a variety of products must make judgments concerning a "best" allocation of resources to products. A best allocation is evaluated in light of the manufacturer's goals. For example, one product lot may be given priority over other product lots because it has a tight schedule or it may be behind in its schedule. Thus, such a high priority lot is favored in allocating resources. Alternatively, a manufacturer may wish to utilize one resource as efficiently as possible to minimize costs. Labor or an exceptionally expensive piece of equipment may be allocated to product lots in a manner which causes these resources to stay busy at a maximum capacity. Judgments must occur to balance one lot's demand for resources against another lot's demand, to balance a desire to expedite a lot against the desire to efficiently use certain resources, and to balance any single lot's demands for resources against overall organizational goals. In a complex organization with a multiplicity of diverse lots contending for a multiplicity of diverse resources, exceedingly complex potential allocation scenarios result, and such "best" judgments are difficult to achieve.

In a typical organization, allocation of resources to lots occurs in two "arenas." The first arena is that of "virtual" allocations. Virtual allocations are the result of using planning and scheduling tools and techniques. Critical Path Method (CPM), Project Evaluation and Review Technique (PERT), and Material Requirements Planning (MRP) represent a few of the conventional planning techniques. In a virtual allocation, no resources are actually used or managed in connection with processing a lot. Rather, information is organized and recorded to describe an intention, plan, or schedule to use various resources in connection with the processing of various lots. Typically, these virtual allocations describe future anticipated activities of the organization.

In contrast to virtual allocations, organizations also perform "actual" allocations of resources to lots. Actual allocations occur when an organization uses resources in connection with the processing of real lots. Of necessity, actual allocations relate to present and past activities of the organization. While virtual allocations are merely informational tasks, actual allocations result from ongoing organizational activities. In addition, an actual allocation may correspond to an informational task which records or otherwise describes actual allocations.

At best, an organization might expect or hope that its actual allocations will mimic its conventionally achieved virtual allocations. However, prior art manufacturing and planning systems fall far short of being able to suggest an optimal virtual allocation of product demands with resources. Consequently, actually achieving an optimal allocation is nearly impossible using conventional techniques.

One explanation for the problems of prior art systems is that virtual allocations generated by such systems are often unrealistic. For example, such conventional systems typically generate virtual allocations based on an assumption that all resources, whether labor or equipment, are treated the same when they are actually allocated. In reality, manufacturers often treat different resources differently. Thus, plans made using such conventional systems are flawed from the outset, and actual allocations tend to differ markedly from the virtual allocations.

In addition, prior art systems often use simplistic "hard" prioritization schemes in allocating resources to lots. Such hard prioritization schemes allocate a resource first to a lot having a higher priority then allocate the resource to a lower priority lot. This and other prioritization schemes often lead to an inefficient use of resources in a complex allocation scenario. In a complex allocation scenario, an allocation of a resource to a lot may often be delayed without harming the lot's overall completion time because of downstream bottlenecks in the lot's processing flow. In such situations, lower priority lots may utilize a resource before the higher priority lots without harming the higher priority lots' completion time. Conventional planning systems which fail to allow lower priority lots to receive resources ahead of higher priority lots in such situations inefficiently allocate resources.

Moreover, such conventional systems typically operate by traversing backward in time. In other words, a desired output time, or deadline, for a product lot is supplied to the system, and the system works backward in time from this deadline to determine when various processes need to be started and completed in order to meet the deadline. Unrealistic plans often result because the system focuses on processes needed to accomplish deadlines more than on resources practically available for allocation or on whether a desired deadline is realistic. Consequently, such virtual allocations are expected to describe only that which an organization believes must happen in order to meet a deadline and not that which can or will actually happen.

Of course, an actual manufacturing environment does not operate backwards through time. Thus, a consequence of such backward traversal is that the prior art systems fail to adequately simulate actual operation of manufacturing environments. For example, prior art systems do not automatically evaluate alternate resource allocation outcomes in generating plans. As a result, the generation of an efficient plan using conventional planning systems is a hit-or-miss proposition at best.

On the other hand, an organization would receive substantial benefits if it could make virtual allocations that could be closely mimicked by actual allocations. Specifically, such mimicry would permit optimized organizational efficiency. Accurate virtual allocation would permit improved use of resources. For example, resources could be kept busy at optimal efficiencies for longer periods of time. Additionally, lots could be sized, designed, and otherwise managed for improved processing, given an organization's resources. Moreover, with close mimicry of actual allocations to virtual allocations, an organization could improve predictions for when its lots would be completed.

SUMMARY OF THE INVENTION

Accordingly, it is an advantage of the present invention that an improved method for virtually allocating resources to lots within an organization so that actual allocations may closely mimic virtual allocations is provided.

Another advantage is that the present invention provides a method for determining resource-to-lot allocations which optimize organizational efficiency.

Another advantage is that the present invention provides a method of virtually allocating resources to lots using a "soft" prioritization scheme which, in certain circumstances, permits resources in contention to be allocated to lower priority lots before being allocated to higher priority lots.

Yet another advantage is that the present invention simulates the operation of an organization to predict outcomes from alternate potential virtual allocations, then selects the most desirable one of such outcomes based on user-defined rules.

The present invention is described herein using a set of related concepts. Accordingly, TABLE I, presented below, provides a glossary of terms and phrases which are used in describing the present invention. For purposes of the present invention, the normal usage of these terms and phrases is to be augmented by the definitions listed in TABLE I.

TABLE I

Plan—a scheme or program identifying future processes to be performed on a lot in order to accomplish organizational goals. The processes specify the use of various resources in operating on the lot. The plan is expressed as an ordered collection of data retained in a media, such as a computer memory, from which it can be later accessed and transferred.

Process—one step in a plan. A process identifies an activity or group of activities which are performed on a lot. A lot may wait during a process before the activity is actually performed. While waiting, a resource or many resources may be consumed, an event which denotes an initial use of the resource. After completion of the activity, previously consumed resources may be released, an event which denotes the final use of the resource.

Lot—generally a tangible item or group of like tangible items toward which a plan's goal is directed. When a lot includes multiple items, all items of the lot are generally processed or operated upon as a unit. For example, a lot may be considered as a product, portion of a product, or other work in process within a manufacturing environment. In addition, a lot may be a dummy, phantom, or otherwise intangible logical need. Thus, an intangible lot may be scheduled to utilize a resource so that the resource's maintenance needs can be met.

Actual Lot—a lot which is then-currently progressing through a manufacturing environment with an aim of being completed.

Virtual Lot—an informational entity which describes a lot that has been identified for scheduling or planning purposes.

Resource—a valuable commodity used or partially used in accomplishing an organization's goals for a lot. A resource may be a service, such as human labor, or a tangible item, such as tools, equipment, transportation systems, and raw materials. In addition, a dummy, phantom, or otherwise intangible resource may be created with attributes that affect a lot parameter. For example, an intangible resource may be created with a capability for processing a maximum quantity of product. Thus, such a resource can operate to limit maximum lot size in the manufacturing environment.

Attributes—parameters which define a specific configuration or quality of a resource. For example, an attribute of an oven may be temperature, and an attribute of a mixer may be a speed at which the mixer operates. If two lots require different attribute capabilities of an otherwise sharable resource, the sharable resource may not be shared by the two lots.

Capability—a value assigned to an attribute to describe a quantity or character exhibited by or required of a resource in a specific situation. If a resource attribute is temperature, a capability of the temperature attribute is a specific number of degrees. Likewise, if an attribute of a consumable inventory item, such as bolts, is quantity, then a specific number of bolts is a capability.

Static Resource—a resource which is allocated to lots in a priority order without regard for whether the resource and lower priority lots remain idle while a higher priority lot completes a prior process or waits in a static wait queue for additional resources to become available. The commitment of a static resource to a lot prevents competing lots from having access to the resource. Raw materials and equipment are typically, although not necessarily, classified as static resources.

Dynamic Resource—a resource which is allocated to any waiting lot when the resource becomes available. When more than one lot is waiting, a priority order determines to which lot the dynamic resource is assigned. In allocating a dynamic resource, a higher priority lot will wait for a lower priority lot to finish with the resource when: 1) the lower priority lot is waiting on the dynamic resource as the dynamic resource becomes available, and 2) the higher priority lot is not yet ready to use the dynamic resource when the dynamic resource becomes available. Labor is typically, although not necessarily, considered to be a dynamic resource.

Fragmentable Resource—a resource which may be applied to a lot in non-contiguous segments of time. For example, labor is applied to a lot in a non-contiguous manner when workers take a lunch break or are interrupted to work on other lots. On the other hand, an oven which cooks a lot would typically not be fragmentable because the cooking process would be harmed if it were interrupted.

Queue—a sub-component of a process. In order for a lot to undergo a process, it must traverse at least one activity queue. In addition, it may traverse through a static wait queue and/or a dynamic wait queue.

Dynamic Wait Queue—a simulated queue where a lot waits for the availability of a dynamic resource. While waiting, no activity is performed with or on the lot. Dynamic resources are consumed during dynamic wait queues. The queue ends when all dynamic resources consumed in the queue become available.

Static Wait Queue—a simulated queue where a lot waits for the availability of a static resource. While waiting, no activity is performed with or on the lot. Static resources are consumed during static wait queues. The queue ends when all static resources consumed in the queue become available.

Activity Queue—a simulated queue where a resource actually performs a service for, an activity with, or operates upon a lot. A resource is released at the end of an activity queue, when all activities requiring the resource have been performed.

Consume—to simulate initial dedication of a resource or portion of a resource for use in connection with the processing of one or more lots. The resource portions consumed during a process cannot be used in connection with other lots until they are later released. Some resources, such as raw materials, need never be released and therefore may never be usable in connection with other lots.

Release—to simulate the giving up of a resource or portion of a resource previously consumed. Resources are released only during an activity queue. Once released, a resource may subsequently be consumed by another lot or by the releasing lot in a later-occurring wait queue. For example, when a mixer has finished mixing a lot, the mixer is released. Thereafter, the mixer may be used with other lots.

Mortgage—to dedicate, promise, pledge, or commit to allocating a resource or a portion of a resource at a specified time in the future and for a specified duration in order to process a lot so that a plan's goal may be achieved. A mortgage removes or reduces the resource's capability or availability for the specified future duration from further allocation.

Vector—a representation of a resource's capability as a function of time. A vector is formed as an array of nodes. Each node includes a value describing a resource attribute's capability and a time value. The nodes are arranged by increasing time values. One node exists for each point in time at which an attribute's capability changes. Vectors are described in more detail in the above-discussed "Means and Method for Managing Manufacturing or Other Resources" patent application.

Queue Slack Time—The amount of time a queue may be delayed without impacting a subsequent queue. This time is the smallest of the resource slack times for any resources consumed in the queue.

Resource Slack Time—The amount of time that the consumption of a resource may be delayed without impacting a subsequent projected allocation of the resource.

Process Flow Description—an ordered collection of processes which, when realized, achieves an organizational goal. A process flow may represent a complex network of decision nodes interspersed with process entities, which characterize the processes, so that a multiplicity of diverse routes or courses may be traversed through the network. A single route or course through the process flow describes a plan for manufacturing an entire product or performing an entire service or an assortment of both. In addition, a process flow may describe a small portion of such products and/or services.

The above and other advantages of the present invention are carried out in one form by an improved method for allocating a multiplicity of organizational resources to a plurality of organizational lots. This allocation permits an organization to accomplish organizational goals. The method forms a list. The list identifies time-valued commitments to future uses of the resources by a first portion of the lots. One of the lots which is not included in the above-discussed first portion of lots is identified. This one lot has a demand for the resources. The particular demand is defined by instructions presented in a process flow description associated with the one lot. This process flow description is obtained, and allocation of the resources to the one lot is simulated. The simulation is based upon the demand and the process flow description instructions, and the resulting simulated allocations do not interfere with the commitments identified in the list. After simulation, the list is modified to reflect commitments to the one lot.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
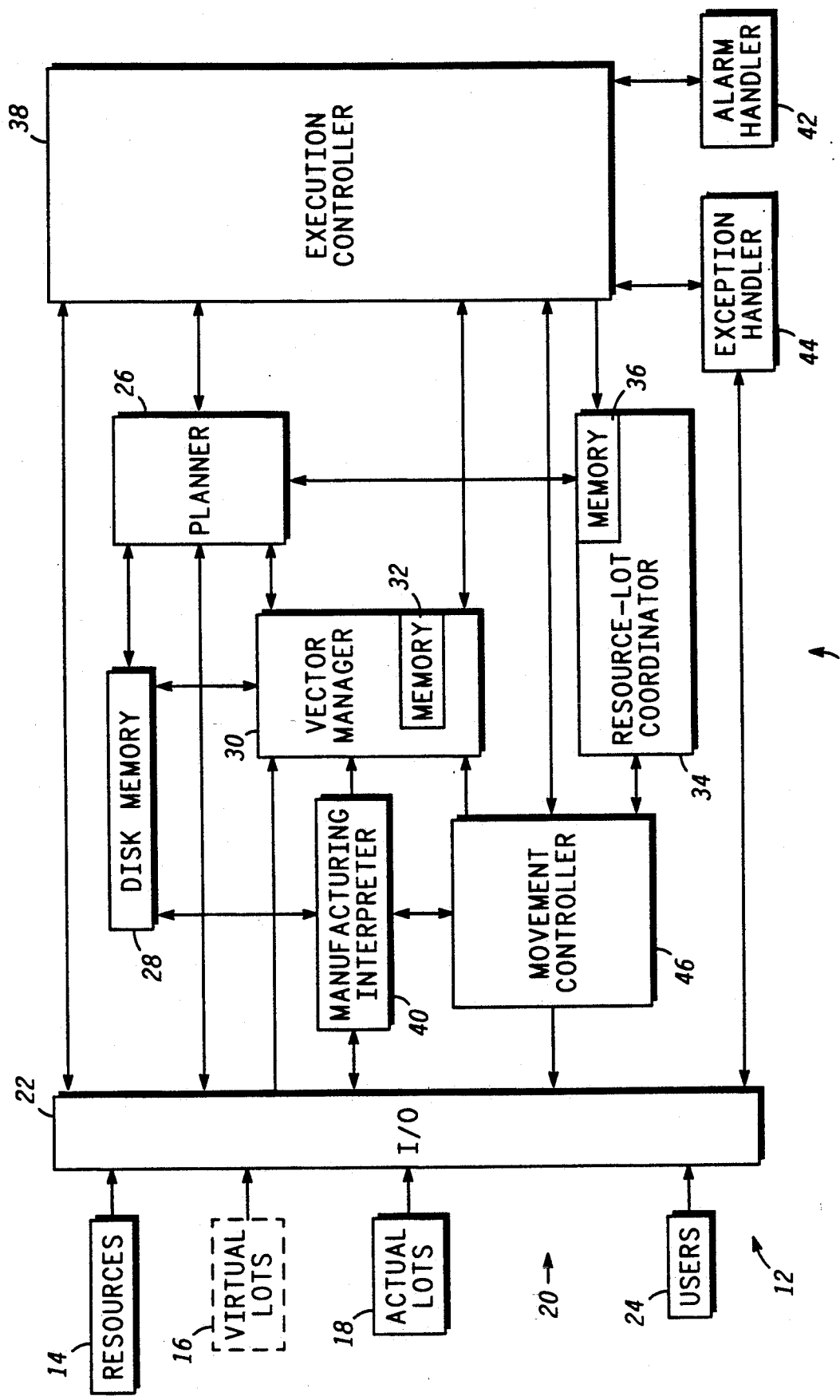
FIG. 1 shows a block diagram of a manufacturing or other organizational environment in which the present invention operates.

FIG. 1 shows a block diagram of a manufacturing or other organizational environment 10 in which a manufacturing control and capacity planning (MCCP) system 12 operates. The present invention is embodied in a planner 26, a disk memory 28, and a vector manager 30 of MCCP 12. However, the present invention may be used in a wide variety of planning and scheduling procedures and need not be used solely in connection with MCCP 12.

Generally speaking, MCCP 12 is concerned with allocating resources 14 (see TABLE I) to virtual lots 16 (see TABLE I) and to actual lots 18. In addition, MCCP 12 is concerned with the coordination of virtual allocations with actual allocations, and vice-versa. MCCP system 12, including the present invention, can operate in connection with any number of resources 14 and any number of lots 16–18. However, as a practical matter the benefits obtained from utilizing MCCP system 12 are expected to increase as the complexity of environment 10 increases. For example, MCCP system 12 is expected to serve an extremely beneficial role when environment 10 includes thousands of resources 14 and hundreds of lots 16–18.

MCCP system 12, including the present invention, is implemented using conventional computer hardware 20. MCCP system 12 is preferably implemented within a conventional distributed computer network, but the present invention also contemplates the use of a single conventional computer. Within a distributed computer system, computer 20 may distribute the processing requirements of the separate components of MCCP system 12, such as planner 26 and vector manager 30, away from one another so that these separate components can simultaneously operate while communicating with one another through messages. The distribution of computing tasks improves the timeliness of information processing by allowing each component to perform its functions in parallel with the operation of the other components of computer 20.

An input/output (I/0) section 22 of computer 20 provides conventional devices for interfacing computer 20 to the physical world. Thus, section 22 includes conventional printers, video terminals, light pens, and other information-passing devices. MCCP system 12 uses section 22 to provide information to human agents or users 24 of environment 10 so that they may identify, define, and manipulate virtual lots 16 and resources 14 and so that they may cause actual lots 18 to be processed in accordance with the information. Furthermore, I/0 section 22 may include sensors, controllers, robots, and the like, which allow a direct automated interface between MCCP system 12 on one side and resources 14 and actual lots 18 on the other, without the intervention of users 24.

Generally speaking, planner 26 of MCCP system 12 couples to I/0 section 22 and aids a user 24 in formulating or generating a plan or schedule for manufacturing a virtual lot 16. Each manufacturing environment 10 and product will have a unique plan for transforming its virtual lots 16 into finished products.

A plan specifies a series of processes (see TABLE I) which must be performed in order to transform a virtual lot 16 into a finished product. In addition, the plan specifies those ones of resources 14 which are needed to carry out the plan and tentative timing data which define when specific processes should take place. At the planning stage, a virtual lot 16 is merely planned and not activated as one of actual lots 18 in environment 10. In other words, a plan for producing a lot may have been made, but no work in progress has been started to accomplish the plan. The plan is retained in disk memory 28, or other type of mass storage memory device, which couples to planner 26. Planner 26 is discussed below in connection with FIGS. 4–14.

Vector manager 30, which includes a relatively fast access, read/write memory 32, such as conventional RAM memory, couples to planner 26, disk memory 28, and to I/0 section 22. Vector manager 30 operates in real time to specify, maintain, and otherwise control the mortgaging (see TABLE I) of future resource capabilities for use with actual lots 18. Vectors (see TABLE I) and vector manager 30 are described in more detail below in connection with FIGS. 4 and 6 and in the above-discussed "Means and Method for Managing Manufacturing or Other Resources" patent reference.

A resource-lot coordinator 34, which includes a relatively fast access, read/write memory 36, such as conventional RAM memory, couples to vector manager 30 and to planner 26. Coordinator 34 operates in real time to maintain a dependency memory structure within memory 36 that informationally links resources 14 with actual lots 18. Thus, coordinator 34 records and manages the virtual allocations of resources 14 to actual lots 18. This managing of virtual allocations includes keeping track of all timing data needed to characterize the virtual allocations. In addition, coordinator 34 is configured to identify dependencies resulting from these allocations and to organize the allocations accordingly. Coordinator 34 is discussed in more detail in connection with the above-discussed "Resource-Lot Association Coordinator" patent reference.

An execution controller 38 simulates the operation of environment 10 based on information maintained by vector manager 30 and coordinator 34. On the basis of these simulations, plans produced by the present invention are cooperatively controlled in real time to optimize actual resource-lot allocations in environment 10. Controller 38 uses a plan generated by the present invention as a baseline for desired organizational performance and continually manipulates virtual allocations in response to deviations in the plan so that actual manufacturing execution will closely mimic the original plan and organizational goals upon which the original plan was based. Execution controller 38 is described in more detail in connection with the above-discussed patent reference entitled "Method of Controlling the Execution of Organizational Plans."

A manufacturing interpreter 40 couples to I/0 section 22, vector manager 30, and disk memory 28. Vector manager 30 initialize its internal knowledge with information provided through manufacturing interpreter 40. Manufacturing interpreter 40 translates data descriptive of a specific environment 10 and specific resources 14 therein into a generic form, which is compatible with the present invention and other components of computer 20. This translation occurs interactively with input from an expert user 24. Manufacturing interpreter 40 is discussed in more detail below in connection with FIGS. 2-3 and in the above-discussed "Process Flow Information Management System" patent reference.

An alarm handler 42 provides a timing function for execution controller 38. This timing function instructs execution controller 38 to reassess simulations of environment 10 or to automatically cause specified ones of actual lots 18 to move based on the lot's plan. An exception handler 44 evaluates deviations identified by execution controller 38 during simulations of environment 10 or by user 24 or another external source through I/0 section 22. The evaluation is customized for particular environments 10 by an expert user 24. After evaluation, a resolution of the deviation is returned to execution controller 38 for continued simulation and control of those actual lots 18 and resources 14 for which deviations were indicated.

A movement controller 46 couples to I/0 section 22, vector manager 30, coordinator 34, execution controller 38, and manufacturing interpreter 40. Movement controller 46 generally controls the movement of actual lots 18 within manufacturing environment 10. Information which initiates such movement may originate from execution controller 38. Appropriate movement instructions and movement feedback information are passed through I/0 section 22 to control actual lots 18. In addition, this movement information and associated feedback may operate as the signaling events which cause MCCP system 12 to progress. For example, this movement information may serve as feedback information to manufacturing interpreter 40 to help improve process flow descriptions (discussed below in connection with FIGS. 2- 3). Likewise, mortgage and allocation data managed in memories 32 and 36 may be updated as a result of such movement information, and future simulations may be initiated as a result of such movement information.

Figure 2:
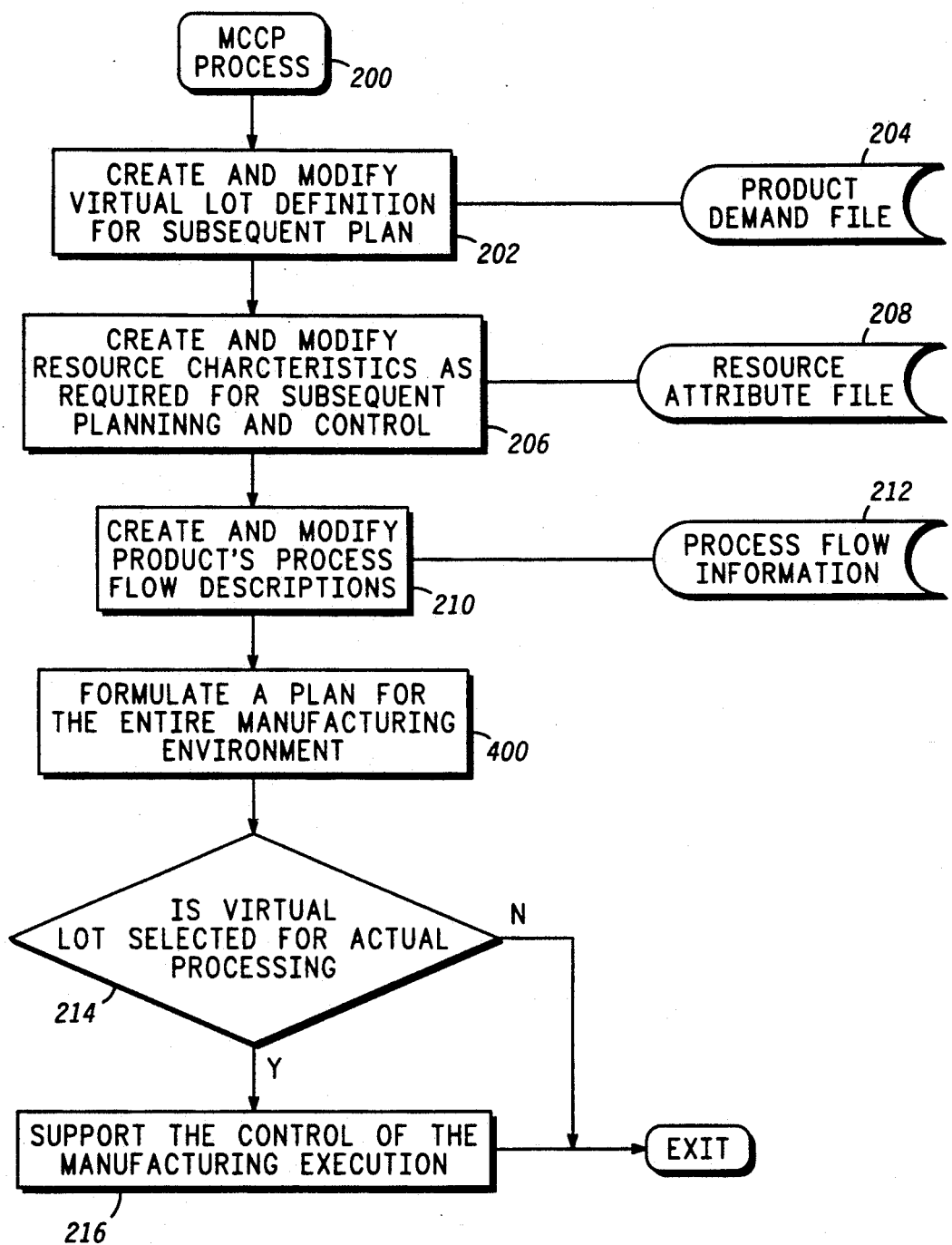
FIG. 2 shows a flow chart of modules performed by a system within which the present invention operates.

FIG. 2 shows a flow chart of an MCCP process 200 performed by MCCP system 12 within environment 10. MCCP process 200 begins with the conception of a "target" virtual lot 16 and ends, with respect to that target lot, at the completion of a corresponding actual lot 18. However, in most circumstances MCCP process 200 operates on many additional virtual and actual lots 16-18 simultaneously with its operation on the target virtual and actual lots 16-18. Thus, MCCP process 200 may operate continuously, and the various modules contained with MCCP process 200 may be activated in parallel with one another with respect to diverse lots 16-18.

A demand identification module 202 generally allows a user 24 to communicate information identifying a virtual lot 16 to MCCP process 200 through planner 26 (see FIG. 1). Each virtual lot 16 places its own set of demands on manufacturing environment 10, and module 202 allows a user 24 to identify the nature of these demands for subsequent planning. Generally speaking, module 202 collects information from a user 24 (see FIG. 1) concerning virtual lots 16. This information collection task may advantageously be performed using conventional database manipulation techniques. Thus, planner 26 prompts user 24 to identify one or more virtual lots 16 and associated characteristics of the identified virtual lots 16.

Specifically, user 24 identifies a virtual lot 16 by giving the virtual lot 16 a name. In addition, user 24 supplies a priority to be associated with the named virtual lot 16, a process flow description (see TABLE I) to use in planning the lot 16, a quantity to be associated with the lot 16, and a status indicator to be associated with the lot 16. The priority data may be specified by assigning a number to the virtual lot 16 or by placing all specified demand request records in a particular order. The process flow description is discussed below in connection with module 210. The quantity data define the size of the lot 16. Planner 26 uses this quantity data to allocate appropriate amounts of resources so that the indicated size of a lot may be realized in environment 10. The status data controls whether the demand request record will be included or omitted from a subsequent plan generated by planner 26.

Each virtual lot 16 identified in task 202 represents a demand request to planner 26, and planner 26 converts data related to each demand request into a data record that is stored in a product demand file 204 in disk memory 28 (see FIG. 1). Upon exit from module 202, product demand file 204 may contain many demand request records.

A resource characterization module 206 generally allows a user 24 to communicate information identifying and characterizing resources 14 to MCCP process 200 through manufacturing interpreter 40 (see FIG. 1). Each of the virtual lots 16 identified in demand identification module 202 requires the use of various ones of resources 14. Resource characterization module 206 allows a user 24 to identify these resources and specify relevant attributes and capability limits (see TABLE I) of the identified resources. This data is stored in a resource attribute file 208 in disk memory 28 (see FIG. 1).

A process flow description module 210 is performed through manufacturing interpreter 40 (see FIG. 1). Module 210 allows a user to communicate information about specific discrete processes which a virtual lot 16 must undergo in order, after being converted into an actual lot 18, to be processed to completion. Manufacturing interpreter 40 performs module 210 in an interactive session with user 24. This collection of information may advantageously be performed using conventional database manipulation techniques. This information is organized into a process flow description and stored in a process flow information file 212 in disk memory 28.

Figure 3:
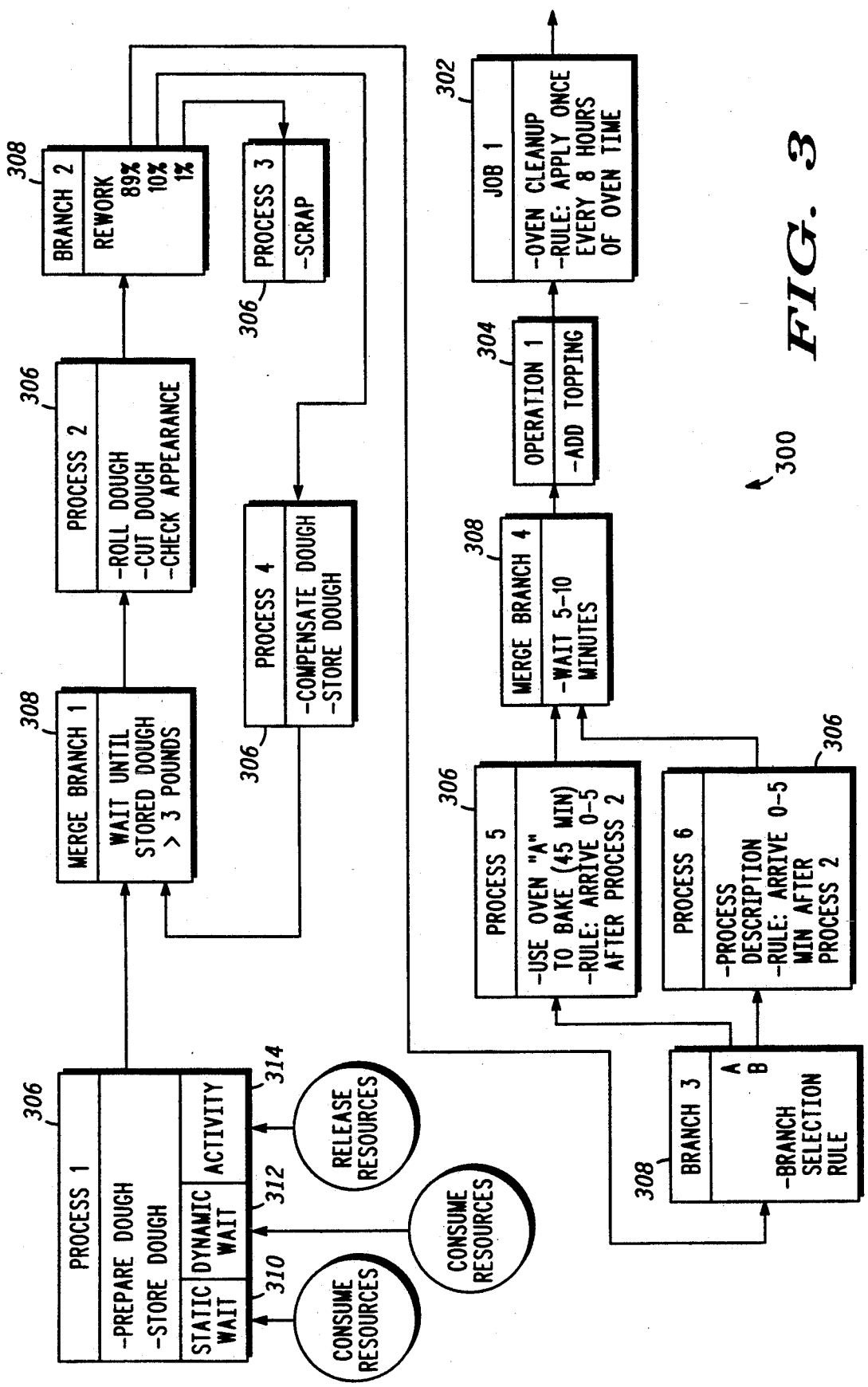
FIG. 3 shows a block diagram of an example process flow description memory structure portion of the present invention.

In order to simplify the concepts embodied in the present invention, FIG. 3 illustrates a process flow description 300 with respect to the extremely simple, specific task of baking cookies. Of course, MCCP process 200 (see FIG. 2) is not dedicated to any particular task but may be programmed with manufacturing requirements by users 24 for a wide variety of tasks, particularly tasks which may be many times more complicated than that shown in FIG. 3. In addition, environment 10 may simultaneously retain and operate upon a multiplicity of process flow descriptions which are aimed toward achieving different goals in relation to a multiplicity of virtual lots 16.

As detailed in the above-discussed "Process Flow Information Management System" patent reference, process flow description 300 is maintained in a memory structure that corresponds to the structure illustrated in FIG. 3. Of course, different process flow descriptions will have different memory structures, but the basic components illustrated in FIG. 3 represent the building blocks which go together to form any process flow description.

Several discrete table or entities are linked together to form process flow description 300. Specifically, description 300 includes job and operation entities 302 and 304, respectively, process entities 306, and branch entities 308. Job entities 302 reside at the top of a hierarchy which includes entities 302-306. Operation entity 304 resides in the middle of the hierarchy, and process entities 306 reside at the bottom. Thus, job entity 302 includes additional process entities (not shown) and optionally includes additional operation entities 304 (not shown). Operation entity 304 includes additional process entities 306. All the subordinate process entities (not shown) included in "Job 1" and "Operation 1" are incorporated in process flow description 300 through reference to Job 1 and Operation 1 in process flow description 300.

It is process entities 306 which define the activities needed to accomplish the organizational goal to which process flow description 300 is directed. Process flow description 300 is divided into several discrete processes which collectively define the steps and resources needed to accomplish an organizational goal. Of course, the present invention places no constraints on the number of processes that a process flow description may include. These processes are defined by user 24 in accordance with the user's understanding of the processes needed to complete the organization's goals.

Each of processes 306 is subdivided into one or more queues. The queues specified for each process are defined by user 24 in accordance with his or her understanding of the processes. Each process contains at least an activity queue, defined above in TABLE I. In addition, each process may include one or more wait queues. As shown in the process entity 306 which is labeled "Process 1", user 24 has included a static wait queue 310, defined above in TABLE I, followed by a dynamic wait queue 312, defined above in TABLE I, followed by an activity queue 314. Although not specifically illustrated in FIG. 3, all of process entities 306 include at least one of these three types of queues.

The present invention bases its generated plans upon whether various resources 14 are identified as being static or dynamic resources. As defined above in TABLE I, the difference between static and dynamic resources lies in the prioritization methodologies employed in allocating resources 14 to lots 16-18. The precise prioritization methodologies applied to specific resources are not important to the present invention. However, as a result of this permitted dichotomy in resource allocation, resource-lot allocation coordinator 34 (see FIG. 1) is able to maximize the number of dependencies (see TABLE I) within the data it processes. Consequently, computer 20 may simulate environment 10 in real time, and simulation results tend to realistically reflect environment 10.

Generally speaking, environment 10 uses dynamic resources 14 more efficiently than it uses static resources 14. In order to use dynamic resources efficiently, some of actual lots 18 may be processed less expeditiously than would result if the dynamic resources were treated as being static. Due to high labor costs, United States manufacturers typically manage laborers so that they stay busy and do not wait around for lots 18 to become available for their services. As a result of this treatment, work in progress tends to wait on the availability of laborers rather than having labor wait until work in progress becomes available to receive the labor's services. Consequently, labor would typically be treated as a dynamic resource.

Static queues, such as queue 310, represent periods of time for which a lot must wait for the availability of a static resource, and dynamic queues, such as queue 312, represent periods of time for which a lot must wait for the availability of a dynamic resource. As shown in connection with Process 1, dynamic queue 312 is described as occurring after a static queue 310 since both types of wait queues are present within a single process entity 306. This relationship between static and dynamic queues should be chosen most often by user 24 because it allows dynamic resources to be treated as a more precious commodity which must be used as efficiently as possible. However, user 24 is free to reverse this order when desired.

Process 1 of the cookie-baking example of FIG. 3 generally identifies activities related to preparing and storing dough. Thus, Process 1 consumes resources. Specifically, the dough's ingredients, such as flour, eggs, milk, sugar, and the like, and equipment, such as bowls, mixers, and the like, are needed in order to perform this activity. In this example, such resources are considered static and are consumed in static wait queue 310. Static queue 310 specifies attributes and capabilities of these attributes to be consumed in static wait queue 310. In this example, a quantity attribute would be specified for the ingredients, and the related capability would be specified in the form of an equation expressed as a function of lot quantity. For example, 0.8 pounds of a specified type of flour may be consumed for each 1.0 pound of cookies to be baked. Likewise, a mixing bowl and mixer may be specified in the form of an equation which expresses a mixing capability as a function of lot quantity. For planning and simulation purposes, that portion of a resource which has been consumed by a lot is treated as being unavailable for allocation to another lot. In other words, the ingredients and equipment consumed in queue 310 will not later be planned or simulated as being available for another lot until being released.

Simulations, discussed below, of environment 10 keep the process flow within static queue 310 until all these consumed static resources are available. When all are available, process flow proceeds to dynamic queue 312. Process flow remains within dynamic queue 312 until a different kind of resource is available. Specifically, process flow is simulated as remaining within dynamic queue 312 until the dynamic resource of a person, hereinafter referred to as a laborer, becomes available. Dynamic wait queue 312 specifies that the laborer's time is required at a rate of, for example, 10 minutes per pound of dough. When the laborer is simulated as being available to work on this cookie lot, the activity specified in activity queue 314 may commence. The availability of a dynamic resource, such as the laborer, is projected during a simulation of environment 10 by considering other tasks to which the resource may be allocated. The simulation does not characterize the dynamic resource as waiting on a lot to become available when other competing lots are already available. Rather, it is allocated to a highest priority one of available lots even when an even higher priority lot may soon become available.

Once the laborer is available, Process 1 continues with activity queue 314, in which the laborer actually mixes the ingredients into dough using the necessary equipment. Additional processing data which is useful in controlling realization of the cooking-baking process and in simulating the cooking-baking process may be associated with activity queue 314. For example, administrative and timing rules may be specified. Simulations of environment 10 follow such rules in allocating resources to lots. According to process flow 300, Process 1 is completed when this dough has been stored for further processing.

Resources may, but need not, be released (see TABLE I) at the completion of an activity queue. When a previously consumed resource is not released, the lot which consumed it continues to use the resource for subsequent queues until process flow description 300 calls for releasing the resource. For example, the ingredients consumed in static wait queue 310 are not released after activity queue 314. Thus, these ingredients continue to be associated with the lot during simulation, and description 300 recognizes that these ingredients are not available for use by another lot.

On the other hand, activity queue 314 in process flow description 300 releases the laborer and the equipment used to mix the dough. Simulations will then consider these released resources as being available for other allocations.

While not specifically shown in FIG. 3, all process entities 306 in process flow description 300 are subdivided into queues like those shown in connection with Process 1. The number and character of these queues are configured as necessary to support the process activities, describe resources consumed and released, and specify attribute capabilities required by the lot. For example, Process 2 calls for rolling the dough, cutting the dough into desired cookie shapes, and checking the resulting appearance of the cookies. Cutting and rolling equipment may be consumed and released in Process 2. Cookie sheets and another laborer may be consumed. The cookie sheets and laborer are not released in Process 2 because they are needed for baking operations, discussed below in connection with Processes 5-6.

Process 3 is configured to characterize activities involved in disposing of scrap dough which cannot be reclaimed, and Process 4 is configured to reclaim or compensate previously rolled and cut dough so that it may be returned to storage for future use in another Process 2.

Processes 5-6 together define the baking activities required to cook the cookies. While Processes 5-6 are described in more detail below, they generally represent alternate process flow paths which a plan produced by the present invention may adopt to bake the cookies. Thus, ovens are consumed and released. Operation 1 includes processes related to adding a topping to the baked cookies, and Job 1 includes processes related to performing maintenance on the ovens used in Processes 5-6. As discussed above, process flow description 300 additionally includes branch entities 308. Branch entities 308 carry information needed to characterize a decision node within the process flow. Each of branch entities 308 is classified into one of two different types of branch entities. One type, simply referred to as a branch entity, splits a flow into multiple alternate flow paths, and the other type, referred to as a merge branch, combines multiple flow paths into a single flow path.

Process flow description 300 positions Branch 2 immediately after Process 2 to split product flow into three different process sub-flow paths. One sub-flow path couples to Branch 3, discussed below, another sub-flow path couples to Process 3, which processes scrap dough, and the other sub-flow path couples to Process 4, which reclaims previously rolled dough. Thus, Branch 1 allows simulation of rework and scrap. Branch 2 includes condition or rule data which defines how to split the cookie lot. For example, Branch 2 may specify that 89% of the lot moves forward, 10% moves to Process 4 for rework, and 1% moves to Process 3 for scrapping.

Process flow description 300 positions Merge Branch 1 immediately prior to Process 2. Merge Branch 1 combines process sub-flow paths from Process 1 and Process 4 together and permits the merged lot to continue only when specified merge conditions have been met. Such merge conditions may, for example, specify that the lot remain stationary until the total quantity exceeds 3 pounds of dough. Thus, simulations recognize that Process 2 will not be performed until a sufficient quantity of dough is present to make it worthwhile.

Process flow description 300 positions Branch 3 immediately after Branch 2. Branch 3 provides branch selection rules which specify which of Processes 5 and 6, or both, to include in a plan for the cookie lot. Generally speaking, Processes 5 and 6 specify alternate techniques for baking the cookies. TABLE II, presented below, contains alternate branch selection rules which a user 24 may wish to associate with Branch 3 to specify which of these alternate techniques to use in particular situations. Likewise, TABLE III, presented below, contains alternate process descriptions which Process 6 may adopt in baking the cookies.

TABLE II

Alternate Branch Selection Rules for Branch 3

1. Select the sub-flow path with the fastest completion time to Branch 4.
2. If lot quantity is less than 10 cookie sheets, select sub-flow A, otherwise select sub-flow B.
3. Split the lot between sub-flows A and B to achieve the overall fastest completion time to Branch 4.
4. Split the lot if lot quantity is too large for the oven.

TABLE III

Alternate Process Descriptions for Process 6

1. Use oven "B" to bake cookies for 25 minutes.
2. Use oven "B" to bake cookies for 45 minutes.

Process 5 specifies that the cookies are to be baked in an oven "A" for 45 minutes. In addition, Process 5 specifies the temperature at which the cookies are to bake, and other relevant attributes, such as the number of oven shelves needed in oven "A" to bake the cookies. If Process 6 incorporates process description 1 listed in TABLE III above, then it specifies that an oven "B" be used to bake the cookies for 25 minutes at a specified temperature. For the purposes of the example process flow description presented in FIG. 3, Processes 5-6 are generally equivalent to one another, and one of Processes 5-6 is selected by evaluating the branch selection rule included in Branch 3. Thus, Branch 3 may include a rule which specifies that the sub-flow path with the fastest completion time to Branch 4 (see rule 1 in TABLE II) be selected. Such a rule is considered a "backwards" rule. The present invention will simulate both sub-flow paths and then look backward within the process flow and choose whichever one of Processes 5-6 achieves the quickest completion time. Thus, if oven "A" is allocated to another lot, the simulation will pick Process 6; and, if oven "B" is allocated to another lot, the simulation will pick Process 5. However, if both are simulated as being available, the simulation will select Process 6 because of a shorter cooking time.

Alternatively, oven "A" may be significantly smaller than oven "B", but cookies are baked for substantially equivalent periods of time in either oven (see process description 2, TABLE III). Thus, Branch 3 may specify a rule which considers lot quantity in choosing a sub-flow path. Rule 2 in TABLE II would then select a sub-flow path including Process 5 when less than, for example, 10 sheets of cookies are being baked. Process 6 would be selected when more than 10 sheets of cookies are being baked.

In yet another alternate scenario, a branch selection rule in Branch 3 may automatically split the lot so that both of Processes 5 and 6 are included in a plan, and sub-lot quantities are adjusted between Processes 5 and 6 so that a fastest overall completion time results (see rules 3 and 4 of TABLE II). Thus, a large lot may be split so that both ovens are used simultaneously to bake cookies.

Merge Branch 4 combines the alternate sub-flow paths indicated by Processes 5-6. Such combination may include a rule which specifies when and how to combine sub-lots. For example, Merge Branch 4 may specify that a lot wait between 5 and 10 minutes for a sibling sub-lot before continuing to the processes of Operation 1.

With reference back to FIG. 2, it is module 210 that is invoked to generate a process flow description, such as the example presented in FIG. 3. After the completion of modules 202, 206, and 210, MCCP process 200 invokes a planning module 400. Module 400 is performed by planner 26 (see FIG. 1) using data saved in disk memory 28 and services provided by vector manager 30. Module 400 simulates the operation of environment 10 to generate a processing plan. This processing plan resembles a schedule in which resources 14 are allocated to virtual lots 16. Moreover, the processing plan balances the demands of multiple virtual lots 16 with one another and with the then-current demands of actual lots 18. Planning module 400 is discussed below in connection with FIGS. 4-14.

After module 400 formulates an acceptable plan, a task 14 converts the virtual lots 16 included in the processing plan, or portions of these virtual lots 16, into actual lots 18. Task 214, which is performed by planner 26 (see FIG. 1) may represent nothing more than a selection of virtual lots 16 for actual processing in manufacturing environment 10 by a user 24. These selections are an informational task. Consequently, nothing happens within manufacturing environment 10 upon the initial conversion of a virtual lot 16 into an corresponding actual lot 18. Rather, this information is passed from planner 26 to vector manager 30, resource-lot coordinator 34 and execution controller 38 to update memory structures which contain data related to actual lots 18.

After these memory structures have been updated in task 214, an execution control module 216 is invoked to control the actual implementation of the processing plan within manufacturing environment 10. Module 216 is performed by execution controller 38 (see FIG. 1) in conjunction with movement controller 46. Module 216 operates in real time as actual lots 18 are being processed. As events within manufacturing environment 10 occur, information describing actual allocations is generated. Additionally, as these events occur, plans concerning actual lots 18 change in response to these actual events. Module 216 continuously generates current information describing virtual allocations of resources 14 to actual lots 18 in response to these changes. Module 216 controls manufacturing execution of a target actual lot 18 until the target actual lot 18 is completed. At this point, a job or product may be finished and ready for transfer out of manufacturing environment 10. Alternately, a product may then be re-introduced into manufacturing environment 10 for incorporation into other lots. Execution control module 216 is described in the abovediscussed "Method of Controlling the Execution of Organizational Plans" patent reference.

Figure 4:
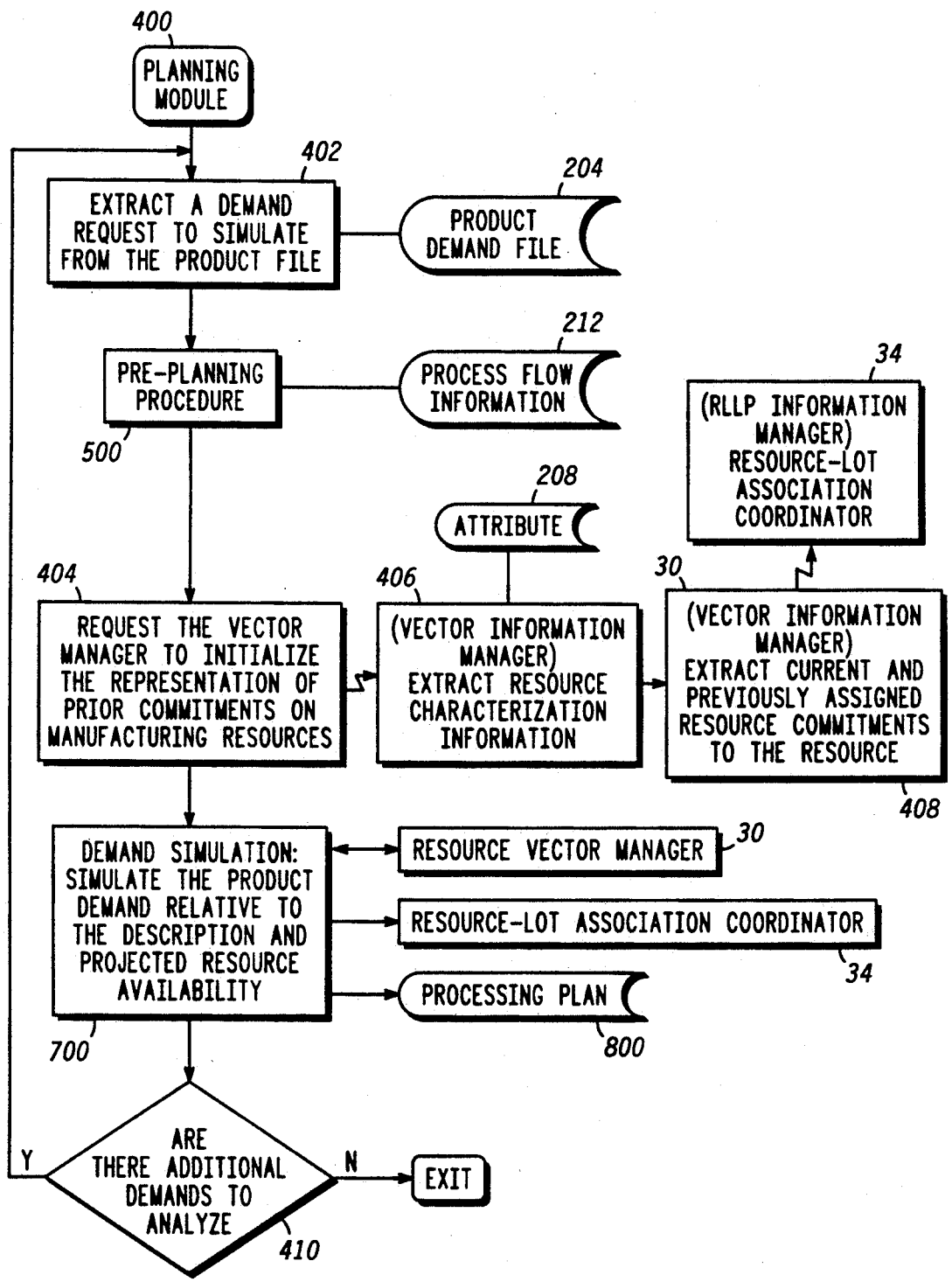
FIG. 4 shows a flow chart of a planning module performed in accordance with the teaching of the present invention.

FIG. 4 shows a flow chart of procedures performed by planner module 400 (see FIG. 2) in generating a processing plan. Module 400 performs a task 402 to start the plan generation. Generally speaking, task 402 extracts a demand request from product demand file 204. As discussed above in connection with module 202 (see FIG. 2) this demand request represents a record which contains data describing the quantity, priority, and status of a lot to be planned. Preferably, at task 402 priority is indicated by order. Specifically, module 400 forms a processing loop which is performed once for each demand request having an active status. The highest priority lot is processed first, and the remaining lots are processed in decreasing priority order.

Figure 5:
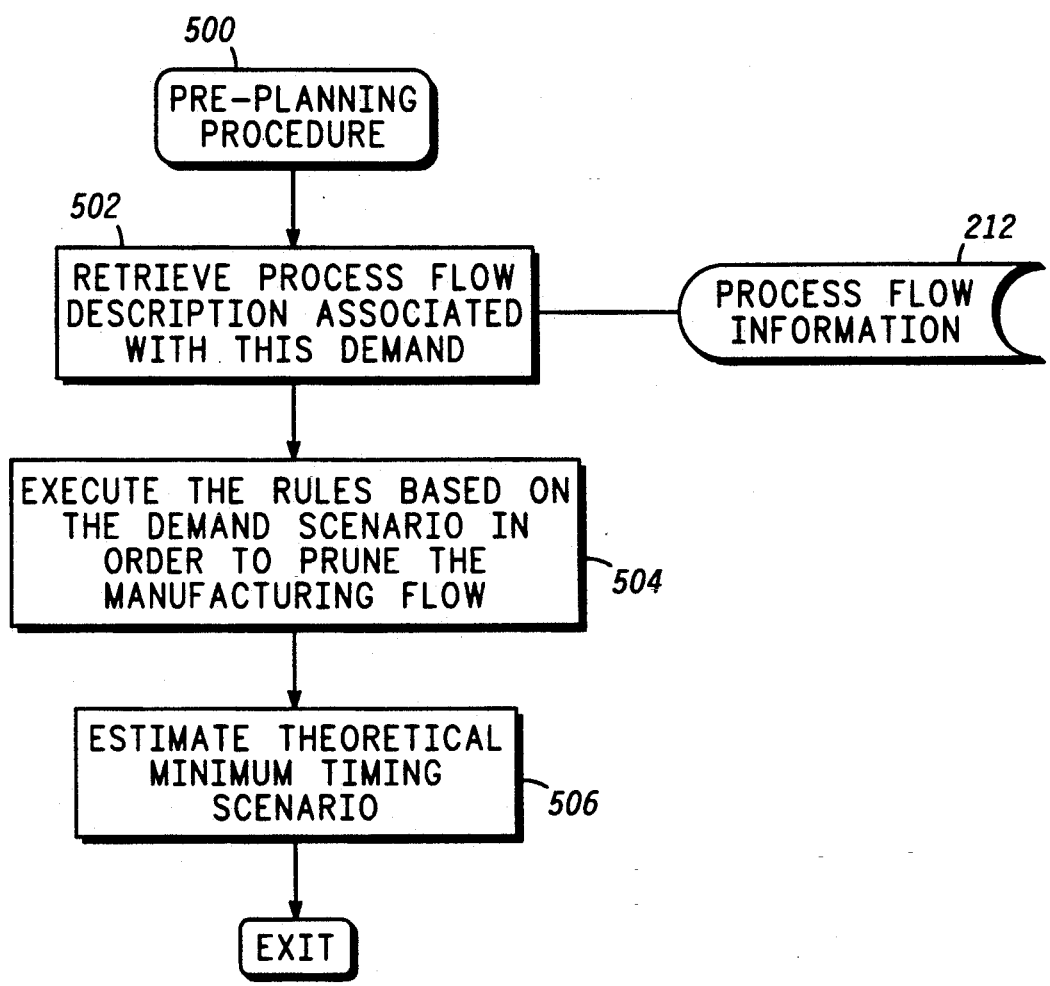
FIG. 5 shows a pre-planning procedure used by the planning module of the present invention.

In addition, the demand request record identifies a process flow description, such as process flow description 300 presented in FIG. 3, to use in connection with planning the lot identified by the demand request record. After task 402, module 400 performs a pre-planning procedure 500, which is shown in FIG. 5. A task 502 of procedure 500 uses the process flow description identifier for this iteration's demand request to retrieve the corresponding process flow description 300 from process flow information file 212.

Next, a task 504 examines process flow description 300 to execute those rules which are based solely on information provided by the demand request. A lot's quantity represents one example of such information. This rule execution prunes the complex network described by process flow description 300 to a smaller size so that it may be simulated more efficiently in subsequent procedures. For example, when Branch 3 (see FIG. 3) includes a branch selection rule based solely on lot quantity, task 504 serves to select or at least disqualify a sub-flow path. Rule 2 listed in TABLE II represents one example of such a rule. With this rule, Branch 3 specifies the selection of Process 5 when less than 10 cookie sheets are being baked and Process 6 otherwise. Thus, for the example presented in FIG. 3, task 504 may prune Branch 3, Process 6, and Merge Branch 4 from process flow description 300. Such pruning reduces the amount of information which subsequent simulations must process, and simulation time decreases.

With reference back to FIG. 5, a task 506 is performed after or along with task 504 to form an initialized processing plan. Task 504 evaluates timing data associated with the queues in process entities 306 (see FIG. 3) by assuming that the lot will not be required to wait in any static or dynamic wait queue. In other words, all consumed resources are assumed to be immediately available when needed. Thus, an initial timing scenario is based substantially upon estimated activity durations of activity queues. This initial scenario represents a minimum timing scenario because it describes the fastest possible processing of a lot. Subsequent simulation uses this initial scenario as a baseline which is delayed as necessary to account for contention for resources 14 by lots 16-18 (see FIG. 1).

After task 506, processing proceeds to a procedure 404, shown in FIG. 4. Task 404 requests vector manager 30 (see FIG. 1) to initialize its mortgaged commitments (see TABLE I) to resources 14. To the extent that resources 14 included in process flow description 300 have not been previously initialized on vector manager 30, vector manager 30 obtains initializing information from resource attribute file 208, as shown at task 406. Currently scheduled resources 14 are managed by resourcelot association coordinator 34, and vector manager 30 obtains commitment data therefrom, as shown at task 408.

Figure 6:
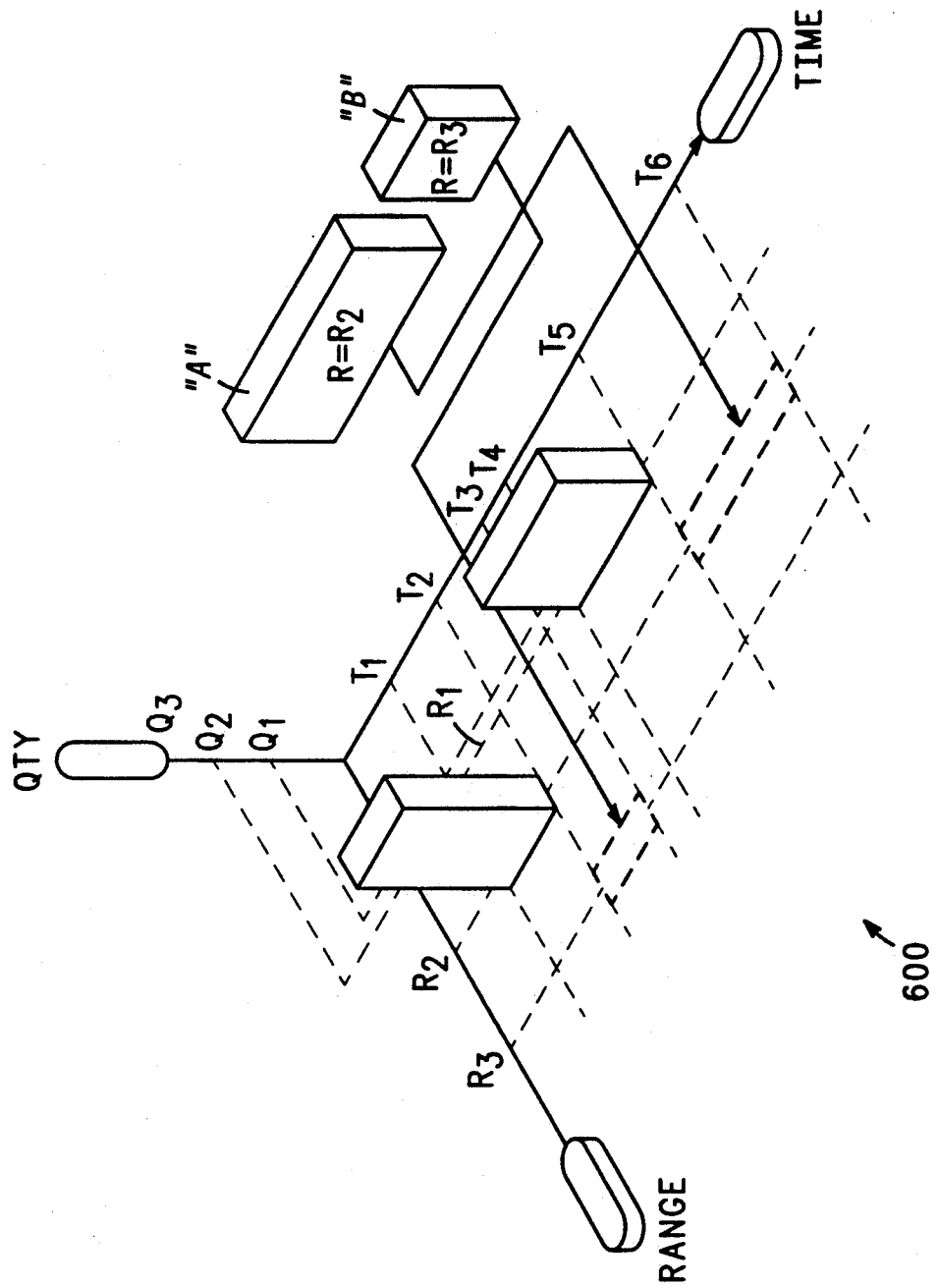
FIG. 6 shows a block diagram of an example timevalued list which records and organizes commitments to future resource usage in the present invention.

Vector manager 30 maintains, in its memory 32 (see FIG. 1) a time-valued list 600 that characterizes these commitments. FIG. 6 shows an example of list 600 as a three-dimensional array which characterizes an oven resource 14. One dimension of the array represents time, and another dimension of the array describes a range of a first attribute, such as the oven's temperature. The third dimension of the array describes a range of a second attribute, such as the oven's capacity. Of course those skilled in the art will recognize that any resource may be characterized by list 600 and that any number of dimensions may be included in list 600 to accommodate a desirable number of attributes. Moreover, vector manager 30 maintains a list 600 for each resource 14 within environment 10.

The FIG. 6 example of list 600 shows a commitment to the described oven resource between times $T_1$ and $T_2$ at a temperature range $R_2$ and a quantity $Q_2$. The oven has additional capacity at the $R_2$ temperature range during the $T_1-T_2$ time slot. Due to this additional capacity, the oven may be shared with another lot so long as the capacity requirements of that additional lot are equal to $Q_3-Q_2$ or less, and the other lot requires temperature range $R_2$. In addition, list 600 shows no commitments for the use of the oven prior to $T_1$, between $T_2$ and $T_4$, and after $T_5$. During the time slot which occurs between $T_4$ and $T_5$, list 600 records a commitment for a $Q_1$ capacity at a temperature range of $R_1$. The oven has additional capacity equal to $Q_3-Q_1$ at the $R_1$ temperature range during the $T_4-T_5$ time slot.

With reference back to task 404 of FIG. 4, vector manager 30 takes a snap-shot of the lists 600 associated with the resources described in process flow description 300. By taking this snap-shot, vector manager prevents future changes to the commitment representations, other than through subsequent simulations performed by planning module 400.

After task 404, planning module 400 performs a demand simulation procedure 700. Generally speaking, procedure 700 simulates the product demand relative to the specified process flow description. Simulation procedure 700 is discussed in detail below in connection with FIG. 7 and FIGS. 9-14. The result of simulation process 700 is a processing plan 800, as shown in FIG. 8.

Processing plan 800 is retained in disk memory 28 (see FIG. 1). FIG. 8 continues to describe the extremely simple, specific job of baking cookies begun above in connection with FIG. 3. Of course, those skilled in the art will appreciate that processing plan 800 is not limited to this or any other specific application, and that the processing plan depicted in FIG. 8 is presented to aid the understanding of the present invention. Processing plan 800 includes much of the information obtained from process flow description 300. Thus, processing plan 800 includes data elements describing processes, such as Processes 1-5, which are linked together and to data elements describing queues (see FIG. 3). In addition, processing plan 800 includes data elements describing resource requirements, associated attribute capability requirements, and manufacturing rule identifiers (see FIG. 3).

Moreover, procedure 700 associates timing data elements 802 with each of the queues included in processing plan 800. In general, timing data elements 802 specify a predicted starting or entry time and stopping or exit time for each queue. However, exit time data elements 802 are optional because the exit time from a queue is the same as the entry time for an immediately subsequent queue. Elements 802 are initialized as discussed above in connection with task 506 (see FIG. 5). Procedure 700 then revises elements 802 as a result of scheduling available capabilities of the required resources, as determined from vector list 600 and process flow description 300. Preferably, the timing data is maintained as timing ranges wherein minimum and maximum times are specified. This scheduling occurs in a manner which prevents violation of manufacturing rules. If needed resource attribute capabilities are not available, then overall scheduling is delayed until the required capabilities are available in a manner that will not violate any manufacturing rules. Through the iterative process of module 400, procedure 700 cooperatively simulates manufacturing environment 10 on all affected lots 16-18 and resources 14 to achieve an optimal, balanced allocation of resources to lots.

In addition, the memory structure which serves as processing plan 800 preferably includes or makes provisions for data elements 804 to record status and process data. Such data elements permit description of feedback, statistical, and status data. Such data are produced during 1) planning, 2) from attempting to actually execute processing plan 800, and 3) from comparing a subsequent actual allocation with the virtual allocation described by processing plan 800. Such feedback, statistical, and status data may be analyzed to suggest improvements in process flow description 300 to allow future processing plans 800 to more closely mimic actual allocations.

Figure 7:
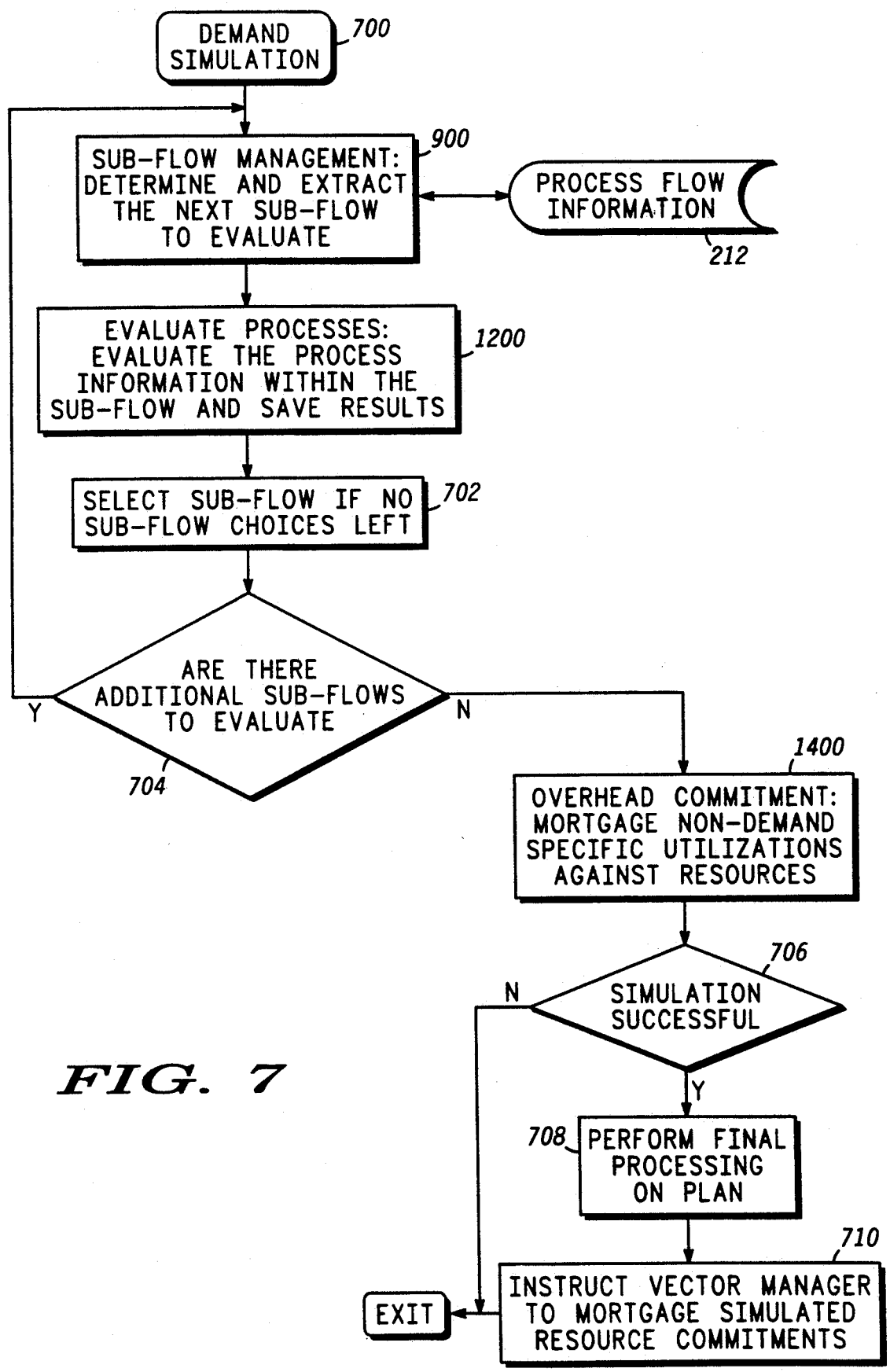
FIG. 7 shows a demand simulation procedure used by the planning module of the present invention.
Figure 8:
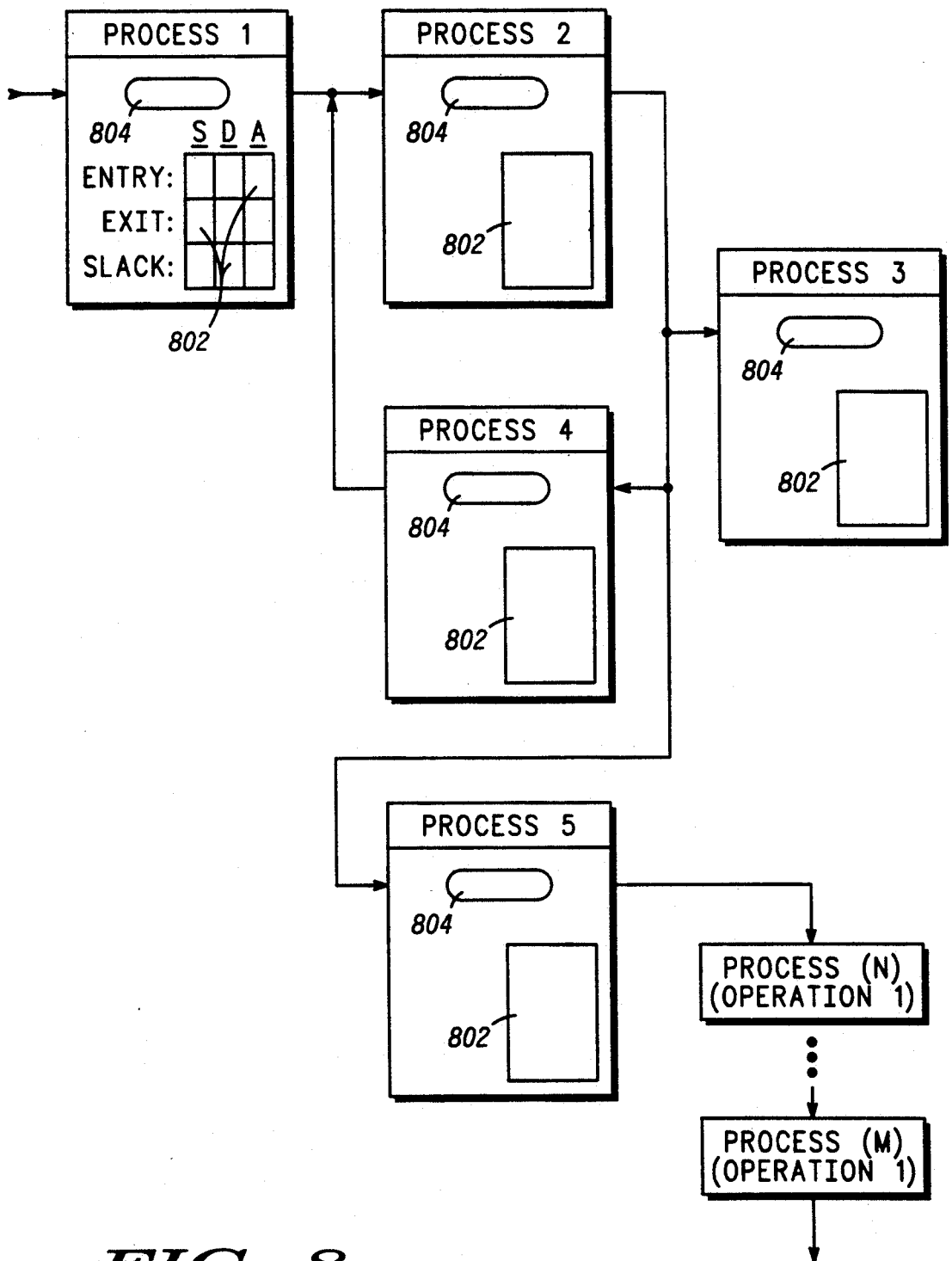
FIG. 8 shows a block diagram of an example processing plan memory structure generated by the present invention.

As shown in FIG. 7, simulation procedure 700 operates in a loop. Procedure 700 performs one iteration of this loop for each sub-flow path included in process flow description 300. However, pre-planning task 504 (see FIG. 5) may have pruned some sub-flow paths from process flow description 300 prior to performance of procedure 700 to speed simulation. A sub-flow management procedure 900 is performed at the top of this loop. Generally speaking, procedure 900 evaluates process flow information file 212 to determine a next sub-flow path, or simply a sub-flow. For purposes of the present invention, a sub-flow is a portion of a process flow description that begins at a branch entity or node and ends at an immediately subsequent branch node. For example, in process flow description 300 (see FIG. 3) sub-flows exist between Merge Branch 1 and Branch 2, Branch 2 and Merge Branch 1, and Branch 2 and Branch 3. In addition, two sub-flows exist between Branch 3 and Merge Branch 4.

Figure 9:
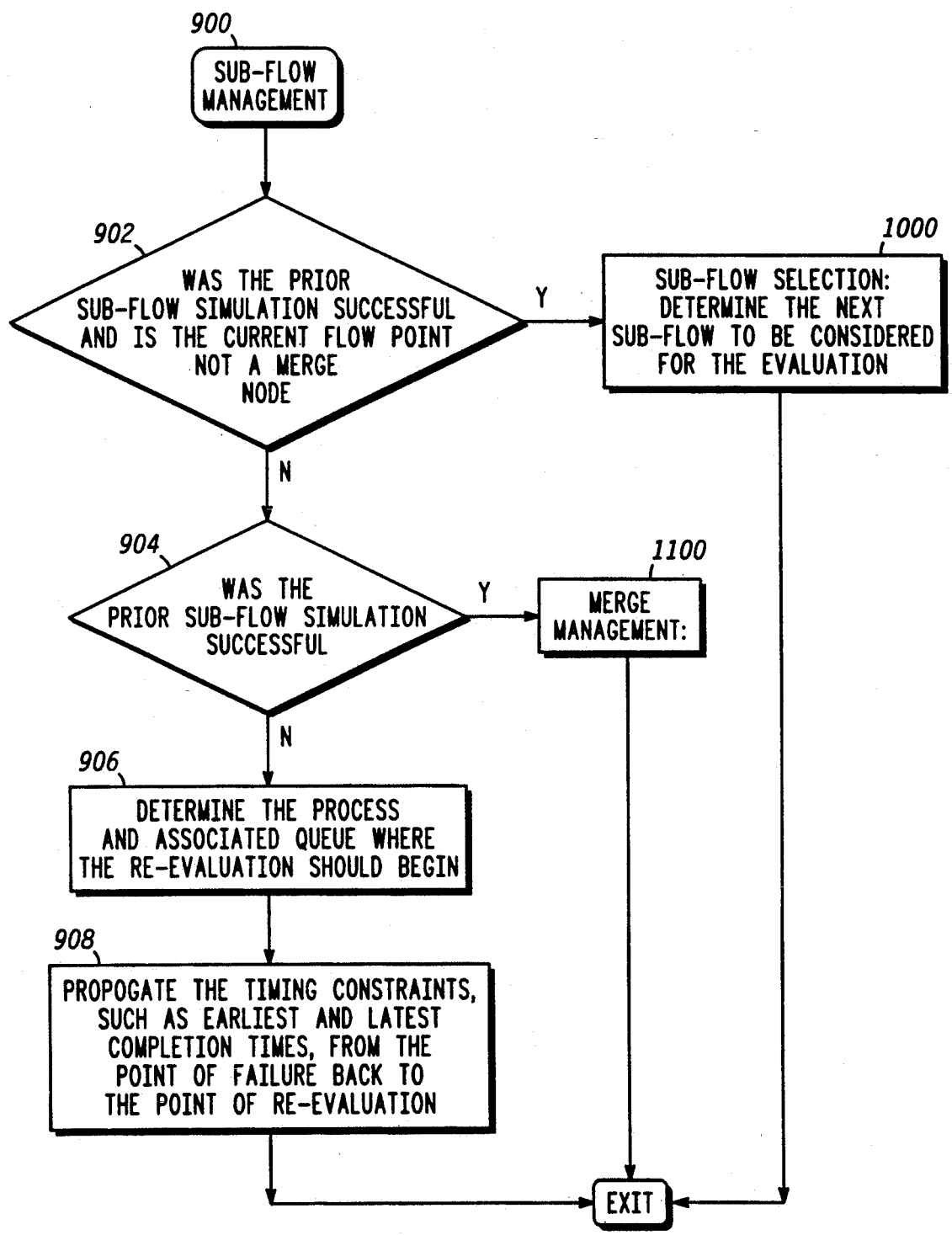
FIG. 9 shows a sub-flow management procedure used by the demand simulation procedure of the present invention.

FIG. 9 shows a flow chart of procedure 900. Upon entry, procedure 900 performs a query task 902 to characterize the previously simulated sub-flow. If the prior sub-flow was unsuccessful or if it ended at a merge branch node, then control proceeds to a query task 904. If no prior sub-flow was simulated, control proceeds to a sub-flow selection procedure 1000. Additionally, if a prior sub-flow simulated successfully and did not end at a merge branch, then control again proceeds to sub-flow selection procedure 1000.

Figure 10:
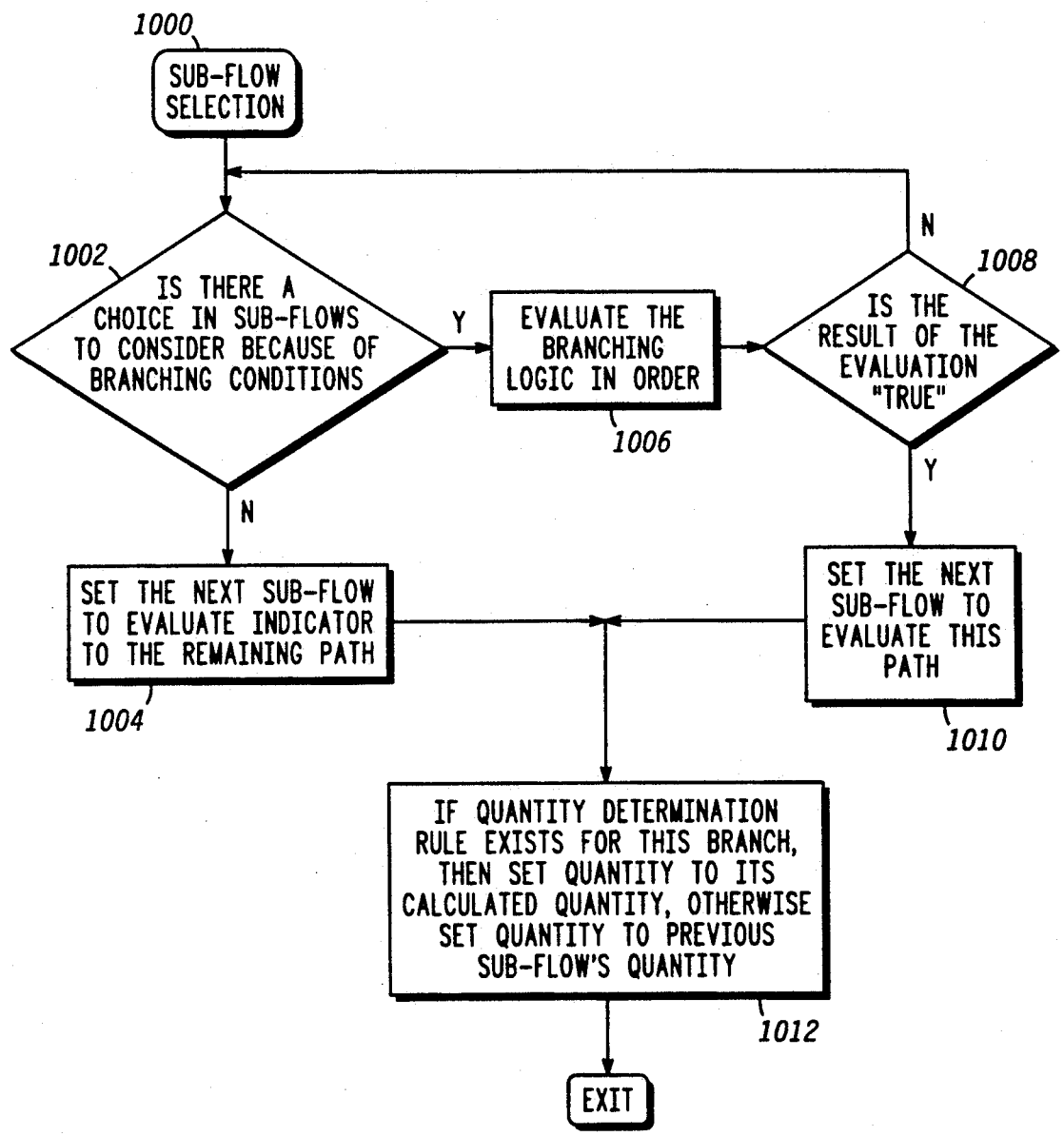
FIG. 10 shows a sub-flow selection procedure used by the sub-flow management procedure of the present invention.

As shown in FIG. 10, sub-flow selection procedure 1000 initially performs a query task 1002. Query task 1002 looks forward in process flow description 300 to determine whether a choice is presented in selecting the next sub-flow. Normally, sub-flows are simulated starting at the beginning of process flow description 300 and proceeding to the end of process flow description 300. Often times, such as at Branch 2 in FIG. 3, a decision must be made to select which of several sub-flows to select for processing. Task 1002 evaluates the remaining, or not-yet-simulated sub-flows originating at the current node and determines if more than one sub-flow remains to be evaluated. If only one sub-flow remains for evaluation, then control proceeds to a task 1004, which identifies the remaining sub-flow as the sub-flow to simulate.

On the other hand, if task 1002 determines that multiple sub-flows which originate at the current node remain to be simulated, then a task 1006 evaluates branching logic within the branching entity 308 (see FIG. 3) to determine which sub-flow to evaluate next. Such branching logic is evaluated in the order in which branching conditions are listed within the branching entity 308, and conditions which evaluate to a "true" condition are selected for subsequent simulation, as shown at query task 1008. Branching conditions are discussed in more detail in the above-listed "Process Flow Information Management System" patent reference. If query task 1008 determines that a branching condition evaluates to a "false" condition, then control returns to query task 1002. On the other hand, when a branching condition evaluates to a "true" condition, control proceeds to a task 1010, where the sub-flow associated with the true condition is selected as the next sub-flow to simulate.

After each of tasks 1004 and 1010, control proceeds to a task 1012. Task 1012 calculates a lot quantity to use in connection with simulating the upcoming sub-flow. When a branch entity 308, such as Branch 2 in FIG. 3, includes a rule which affects lot quantity, task 1012 evaluates that rule to calculate the lot quantity. For example, task 1012 would calculate that 89% of the lot quantity present at Branch 2 is to be passed along to Branch 3, 10% to Process 3, and 1% to Process 4. On the other hand, a branch entity 308 need not include a quantity altering rule, and in such situations task 1012 calculates the lot quantity to be unchanged as a result of the branch entity.

Upon completion of task 1012, a sub-flow has been selected for simulation, and a lot quantity has been determined for the selected sub-flow. Control then exits sub-flow selection procedure 1000, sub-flow management procedure 900 (see FIG. 9) and returns to demand simulation procedure 700 (see FIG. 7).

With continued reference to FIG. 9, tasks 906 and 908 are performed to select a sub-flow when a prior sub-flow simulation was unsuccessful, as indicated at query task 904. An unsuccessful simulation typically results from a simulated violation of an administrative or processing rule. Such a rule is shown at Merge Branch 4 of process flow description 300 (see FIG. 3).

In the example of FIG. 3, Merge Branch 4 includes a rule which requires cookie lots from Processes 5 and 6 to remain at Branch 4 between 5-10 minutes before being combined and proceeding. This rule insures that baked cookies sit out of the oven for a controlled amount of time before subsequent topping steps are taken. Task 904 evaluates such rules to determine if they were violated, and if a violation occurred, control proceeds to tasks 906 and 908.

Tasks 906 and 908 cause the upcoming simulation to re-simulate previously simulated sub-flows so that a rule violation is less likely to occur. Task 906 determines a process, and a queue within the process, where a re-evaluation should begin. Often, this re-evaluation point is established at the beginning of the rule. In the case of Merge Branch 4, the beginning of the timing rule is Branch 3, where the lot was split for re-combination at Merge Branch 4.

In addition, a resource slack time variable (see TABLE I), which is determined by evaluating list 600 (see FIG. 6), may push the re-evaluation point further backward in process flow description 300. FIG. 6 illustrates how resource slack time may push a re-evaluation point backwards. For example, the resource commitment illustrated at time slot $T_1-T_2$ has a resource slack time equivalent to $T_4-T_2$. In other words, the commitment may be delayed so that usage of the resource finishes at any time prior to T4 before such usage impacts the next commitment to the resource. If task 906 determines that a timing rule is violated by a duration which is less than $T_4-T_2$, then the resource's use may simply be delayed to solve the timing rule violation.

However, if the timing rule violation is for a duration which is greater than $T_4-T_2$, then the resource cannot simply be delayed to cure the timing rule violation because such delay would adversely impact the commitment at time slot $T_4-T_5$. In this situation, the re-evaluation point is pushed backwards within process flow description 300 to the queue where the $T_1-T_2$ commitment to the resource initially takes place. All simulated commitments from that point forward are erased, and simulations continue forward again from that point.

The re-simulations operate with a constraint that urges later-occurring commitments and prevents the precise prior commitments from being re-simulated. Thus, task 908 propagates changes in timing data, such as estimated minimum and maximum queue exit times and slack timing, described by data elements 802 in FIG. 8, backwards to the re-evaluation point. The magnitude of these changes is based upon the duration for which the timing rule was violated. After task 908, control returns to demand simulation procedure 700 (see FIG. 7).

Figure 11:
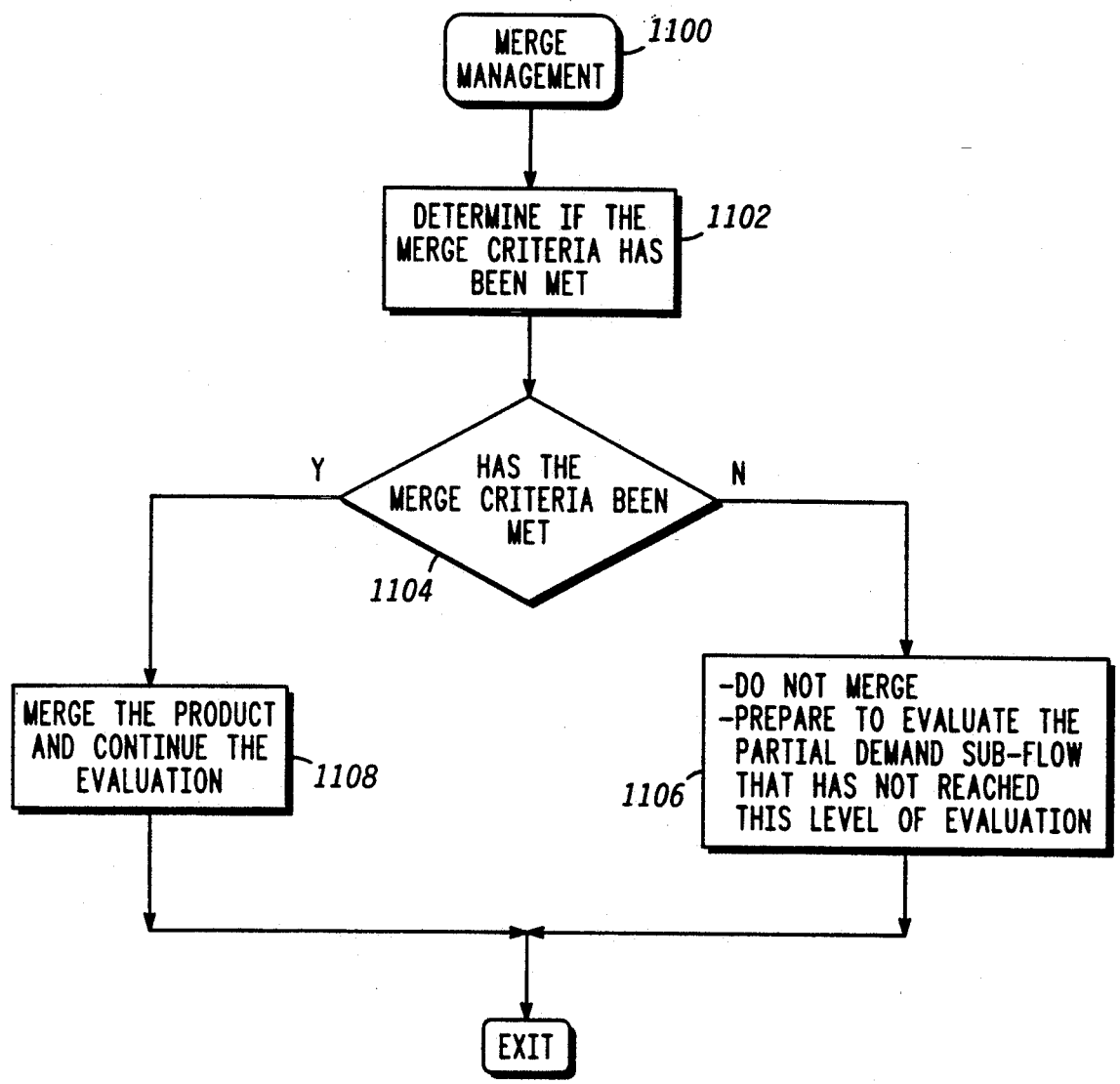
FIG. 11 shows a merge management procedure used by the sub-flow management procedure of the present invention.

With reference back to query tasks 902 and 904, when a sub-flow ends at a merge node, sub-flow management procedure 900 transfers control to a merge management procedure 1100. FIG. 11 shows a flow chart of procedure 1100. Generally speaking, merge management procedure 1100 determines whether to merge multiple sibling sub-lots into a common lot and proceed, or what sub-flow to evaluate if a merge cannot be simulated yet. As shown in FIG. 11, a task 1102 evaluates a merge criteria, and a query task 1104 determines if the merge criteria has been met yet. With reference to the above-discussed Merge Branch 4 of FIG. 3, the merge condition is met after the sub-flows which include Processes 5 and 6 have both been simulated. When just one of the sub-flows has been simulated, task 1104 routes control to a task 1106. Task 1106 selects the next sibling sub-flow for simulation. In other words, task 1106 traverses backwards along an unsimulated incoming flow path to find the next sub-flow. Sub-lot quantities are determined as discussed above in connection with task 1012 (see FIG. 10). No merge is simulated at this point.

On the other hand, when query task 1104 determines that a merge criteria has been met, a task 1108 performs the merge operation. In the merge operation, sibling sub-lots are replaced by a single lot which represents the combination of all sibling sub-lots, and a lot quantity parameter is adjusted accordingly. After tasks 1106 or 1108, program control exits merge management procedure 1100 and sub-flow management procedure 900 with a new sub-flow selected for simulation. Program control returns to an evaluate processes procedure 1200 (see FIG. 7). Procedure 1200 resides in demand simulation procedure 700 after sub-flow management procedure 900. Procedure 1200 evaluates the process entities 306 (see FIG. 3) included within the sub-flow selected by sub-flow management procedure 700.

Figure 12:
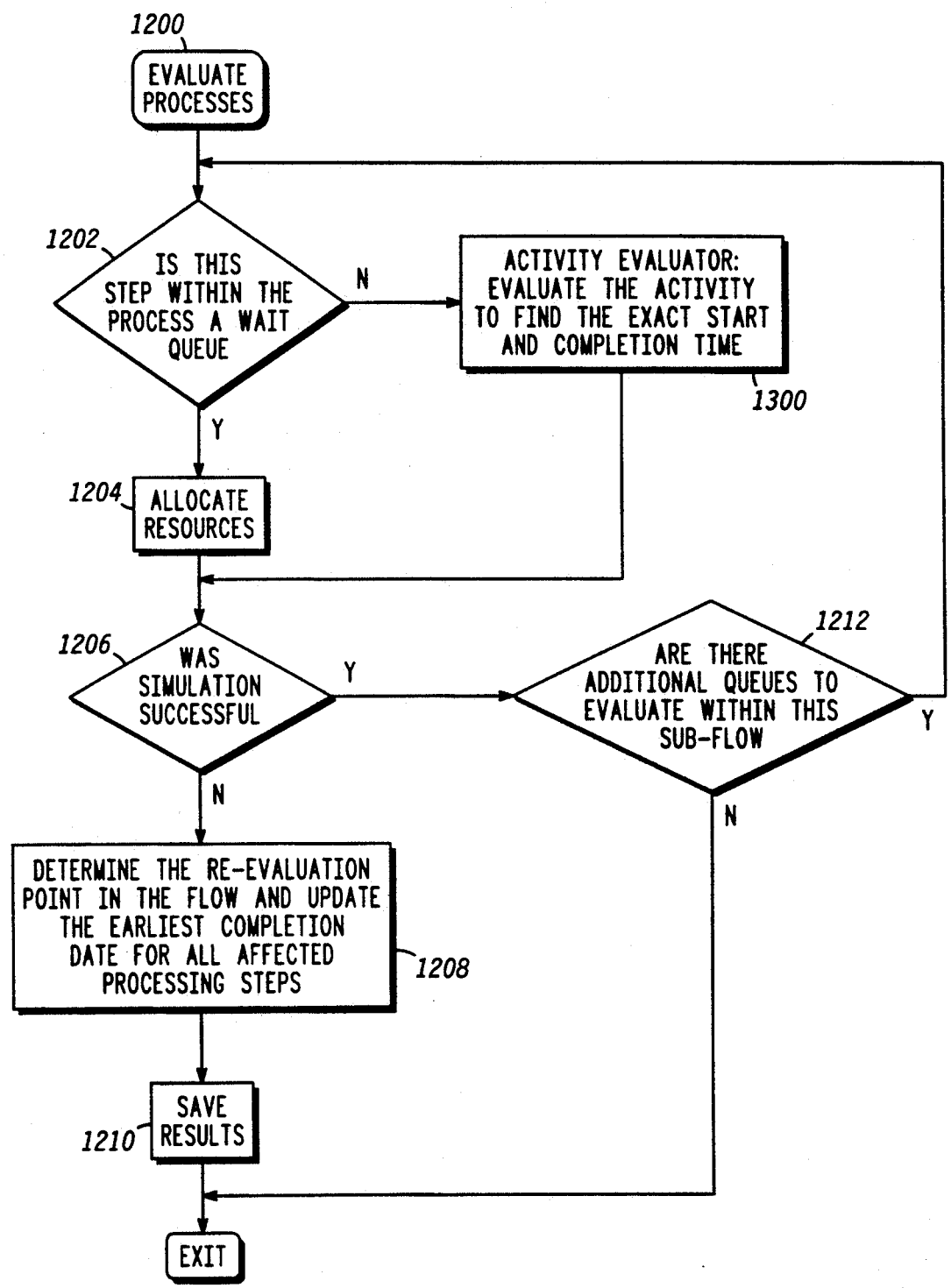
FIG. 12 shows an evaluate processes procedure used by the demand simulation procedure of the present invention.

FIG. 12 shows a flow chart which describes procedure 1200. Generally speaking, procedure 1200 forms a loop which performs one iteration thereof to evaluate each queue included in the sub-flow. The order of evaluation is the order in which the queues are arranged within process flow description 300.

A query task 1202 is performed upon entry into procedure 1200 and at the beginning of each iteration of the loop. Task 1202 examines the queue to determine its type. If the queue is an activity queue, control proceeds to an activity evaluator procedure 1300, discussed below in connection with FIG. 13. If the queue is a wait queue, such as a static or dynamic wait queue, control proceeds to a task 1204.

Task 1204 operates in conjunction with list 600 (see FIG. 6). Specifically, task 1204 communicates the identification of a resource to be consumed in a wait queue to vector manager 30 (see FIG. 1). In addition, the required attributes are communicated along with the minimum duration for which the resource is needed and the earliest point in time at which the resource is needed. Task 1204 obtains this resource and attribute information from the queues 310–312 of the process entity 306 (see FIG. 3) being currently evaluated. Task 1204 obtains the timing information from data elements 802 (see FIG. 8). Elements 802 were initialized in task 506 (see FIG. 5) and possibly modified as a result of a prior simulation of this sub-flow.

With reference to the example of list 600 presented in FIG. 6, vector manager 30 evaluates list 600 to determine the earliest time when the resource is available as requested. If the oven resource illustrated by list 600 in FIG. 6 is being allocated to a lot "A", then time slot T5–T6 is the first time slot at which it is available as requested. Conflicts with prior mortgaged commitments prevent allocation of the oven resource prior to time T5. Task 1202 evaluates this availability timing information for all resources being consumed during the queue and calculates a time slot at which all the consumed resources are concurrently available. This calculation may require multiple evaluations of list 600 as requested time slots are progressively delayed until a solution is determined.

After task 1204, a query task 1206 determines whether the simulation was successful. A simulation may be unsuccessful when the timing solution determined in task 1204 violates a timing rule. Alternately, activity evaluator 1300 may be unsuccessful in simulating an activity queue, as discussed below. When the simulation is not successful, a task 1208 determines a re-evaluation point in the process flow and propagates timing data to all intervening process steps. Task 1208 operates similarly to tasks 906–908, discussed above in connection with FIG. 9. After task 1208, a task 1210 saves the revised timing data in data elements 802 (see FIG. 8) and exits procedure 1200.

If query task 1206 determines that a successful simulation of the queue occurred, then a query task 1212 inquires whether additional queues remain to be simulated in this sub-flow. If no additional queues remain, then simulation of the sub-flow is complete, and control proceeds back to task 1210, which saves the simulation results before exiting procedure 1200. If additional queues remain, then the next queue is identified and control is routed back to the top of the loop at query task 1202.

Figure 13:
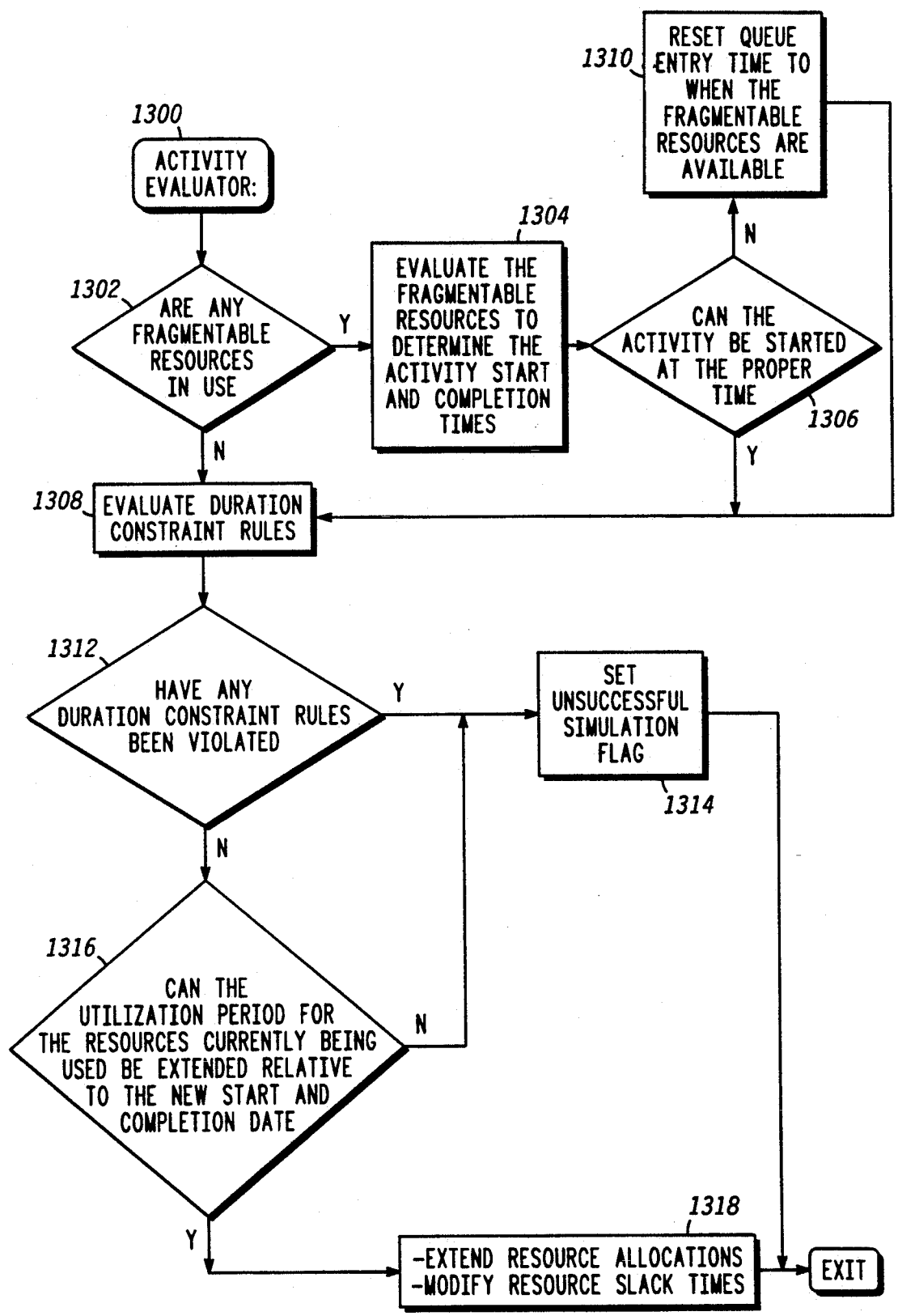
FIG. 13 shows an activity evaluator procedure used by the evaluate processes procedure of the present invention.

When query task 1202 detects an activity queue 314 (see FIG. 3), control proceeds to activity evaluator 1300, which evaluates the precise start and completion times for the activity. FIG. 13 shows a flow chart of activity evaluator 1300. Activity evaluator 1300 performs a query task 1302 to determine whether any fragmentable resources (see TABLE I) are in use during the activity queue. Fragmentable resources are those for which time may be disbursed in a non-contiguous manner. For example, a laborer is typically considered a fragmentable resource because the laborer's time may be interrupted by coffee breaks, lunch breaks, and the like. Such resources are in use when they have been previously consumed and not yet released. A list of such resources (not shown) is easily maintained by those skilled in the art. When a fragmentable resource is in use, control proceeds to a task 1304.

Task 1304 consults a list 600 (see FIG. 6) for such resources to determine if any commitments which would fragment the resource's time away from the activity are listed, as show in a query task 1306. If no commitments are listed, then the activity can be immediately started, and control proceeds to a task 1308. On the other hand, if the start of the activity must be delayed to accommodate fragmentable resources, control proceeds to a task 1310. Task 1310 resets elements 802 (see FIG. 8) to describe an activity queue entry time when the fragmentable resources are all concurrently available. This resetting occurs in a manner similar to that described above in connection with task 1204 of FIG. 12. After task 1310, control proceeds to task 1308.

Task 1308 evaluates any duration constraint rules associated with the activity queue of the process. The example process flow description presented in FIG. 3 shows such duration constraint rules in connection with Processes 5 and 6. In the FIG. 3 example, a duration rule requires Process 5 or Process 6 to begin within five minutes after completion of Process 2. These rules insure that prepared cookie dough does not sit for longer than 5 minutes before it is baked. Task 1308 examines the queue entry timing element 802 (see FIG. 8), and a query task 312 determines if the rule has been violated.

If a duration rule was violated, then task 1314 sets a flag which indicates that the simulation was unsuccessful. Control then exits activity evaluator 1300 and returns to query task 1206, discussed above in connection with FIG. 12. Query task 1206 will detect the unsuccessful simulation and take steps to re-simulate prior simulated sub-flows so that the duration rule may not be violated again.

If a duration rule is not violated, then a query task 1316 evaluates resource slack times for the resources being used to determine if resource usages may be extended as needed to accommodate the results of task 1310. If insufficient resource slack time exists, then control again proceeds to task 1314, which sets the unsuccessful simulation flag before exiting activity evaluator 1300. On the other hand, if sufficient resource slack time exists, then a task 1318 extends allocation of the resources and modifies slack time elements 802 (see FIG. 8) accordingly before exiting activity evaluator 1300. When activity evaluator 1300 exits from task 1318, a successful simulation of the activity queue has occurred.

When control returns to task 1206 of evaluate process procedure 1200 (see FIG. 12), control continues as discussed above in connection with wait queues. After completion of task 1210, in which simulation results were saved, control returns to a task 702 of demand simulation procedure 700, as shown in FIG. 7. At this point in the method of the present invention, either a sub-flow has been successfully simulated or a re-evaluation condition has been detected.

In situations where backwards branch rules dictate the selection of alternate sub-flows, task 702 performs the selection based upon the simulation results. Rule 1 of TABLE II, discussed above in connection with Branch 3 of FIG. 3, presents such a rule. In this situation, a rule specifies selection of the sub-flow having the fastest completion time to Branch 4. After simulating the sub-flows which include Processes 5 and 6, task 702 performs this selection by comparing the exit timing data elements 802 (see FIG. 8) for each of the sub-flows. The fastest sub-flow is flagged for acceptance and the slowest sub-flow is flagged to be discarded later. This flagging may be accomplished by appropriately setting elements 804 in processing plan 800 (see FIG. 8). The slowest sub-flow cannot be discarded at this point in evaluating process flow description 300 because a future re-evaluation may alter the selection of task 702.

After task 702, demand simulation procedure 700 performs a query task 704. Task 704 determines whether the demand includes additional sub-flows to simulate. When additional sub-flows exist, control returns to sub-flow management procedure 700, discussed above. Thus, demand simulation procedure 700 remains in a loop consisting of procedures 900 and 1200 and task 702 until the entire demand request has been simulated to the end of process flow description 300.

At completion of the entire demand request, task 704 routes program control to an overhead commitment procedure 1400. Generally speaking, procedure 1400 mortgages commitments within lists 600 (see FIG. 6) against nondemand specific utilizations. Lunch breaks, coffee breaks and other fragments of fragmentable resources, discussed above in connection with task 1304 (see FIG. 13), may represent such non-demand specific utilizations. In addition, such non-demand specific utilizations may be included in Job 1, shown in FIG. 3. Job 1 includes processes for performing oven cleanup and maintenance. As specified in Job 1, such cleanup occurs every eight hours. Thus, fragments of fragmentable resources and the processes of Job 1 are not specifically dedicated to any particular demand but to general work schedules and usage of the oven, respectively. The cleaning and maintenance procedures are scheduled and included in list 600 so that no future lot simulations will receive an allocation of the resource when it is undergoing such cleaning and maintenance.

Figure 14:
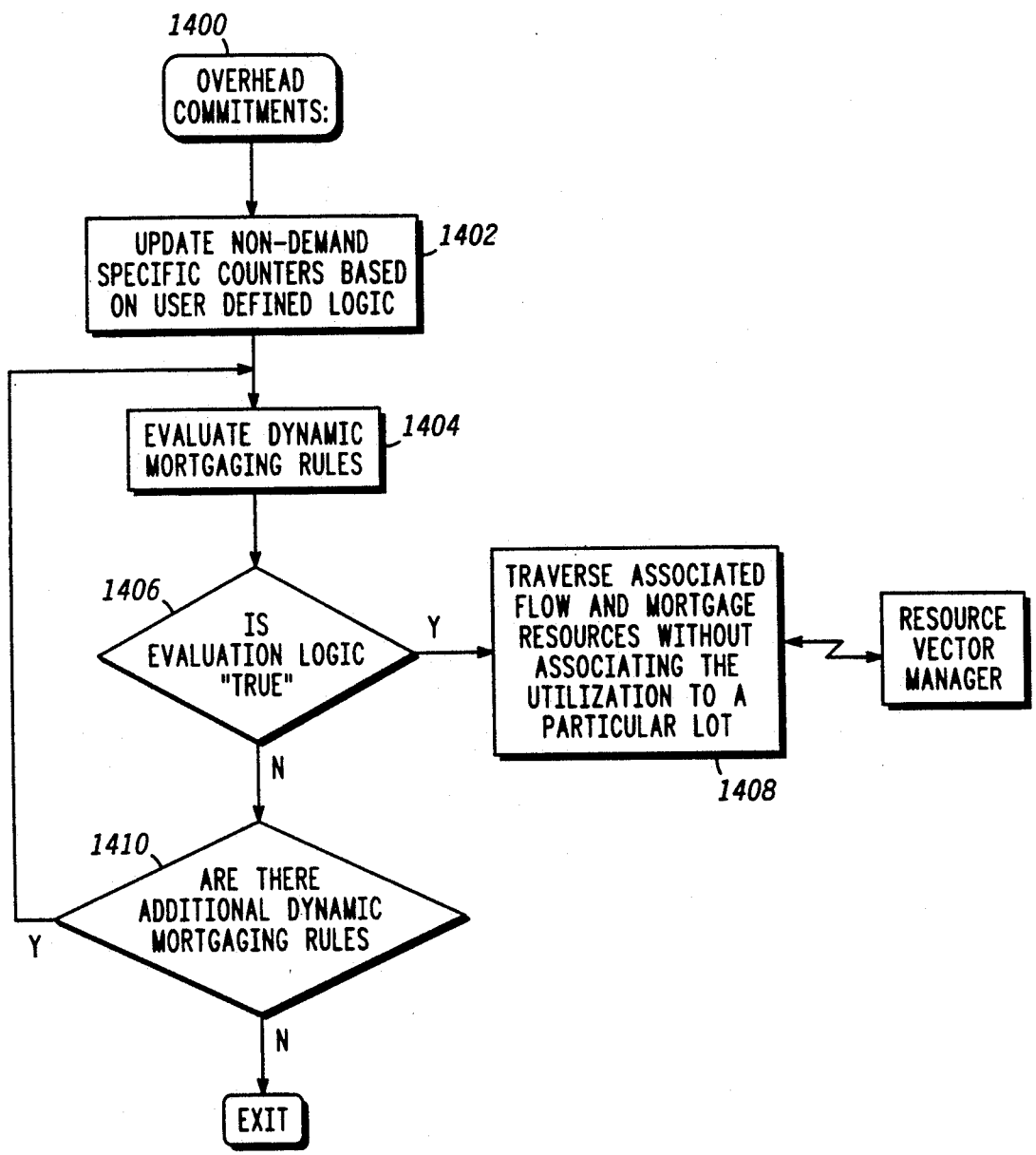
FIG. 14 shows an overhead commitments procedure used by the demand simulation procedure of the present invention.

FIG. 14 shows a flow chart of overhead commitment procedure 1400. In a task 1402, non-demand specific counters are updated to reflect the usage of the affected resources. Thus, task 1402 updates a counter (not shown) which keeps track of the hours for which the oven in the example of FIG. 3 has been used. Next, a task 1404 evaluates any dynamic mortgaging rules associated with the non-demand specific utilization. Following the FIG. 3 example, task 1404 evaluates the rule which specifies the performance of Job 1 after eight hours of baking time. A query task 1406 determines whether the result of the evaluation is a "true" or "false" condition. When true, the associated processes (not shown) of Job 1 are traversed as discussed above to make a commitment to allocation of the resource for the performance of Job 1, as shown at a task 1408. Thus, task 1408 communicates with vector manager 30 to cause list 600 (see FIG. 6) to be modified to reflect the cleaning. If no other process can share use of the resource during Job 1, then an attribute, such as quantity, may be specified at a maximum range to prevent future simulations from sharing the resource during Job 1.

After task 1408, or when task 1406 detects a false evaluation, control proceeds to a query task 1410. Task 1410 tests for additional dynamic mortgaging rules, and routes control back to task 1404 when such additional rules are detected. When task 1410 determines that the last dynamic mortgaging rule has been evaluated, control exits overhead commitment procedure 1400 and returns to demand simulation procedure 700 at a query task 706, as shown in FIG. 7.

Task 706 is performed after an entire demand has been simulated. Task 706 investigates whether the simulation was successful or whether a failure occurred that resimulations could cure. When task 706 detects an unsuccessful demand simulation, an appropriate error message is presented to user 24 through I/O section 22 (see FIG. 1) and control exits demand simulation procedure 700 to return to task 410 of planning module 400 (see FIG. 4). However, when task 706 detects a successful demand simulation, a task 708 performs final processing on processing plan 800 (see FIG. 8). Such final processing may include the evaluation of alternate sub-flows which have been flagged for inclusion and removal from processing plan 800, as discussed above in connection with task 702. The removal of sub-flows prunes unnecessary portions of process flow description from processing plan 800. After task 708, a task 710 instructs vector manager 30 to mortgage the remaining simulated resource commitments so that future simulations will not alter them. Referring to FIG. 6 and the above-discussed example of allocating an oven resource to lot "A", this mortgage has the effect of inserting block "A" into list 600 at the position indicated by dotted lines in time slot T5—T6. After task 710, control exits demand simulation procedure 700 and returns to planning module 400 at query task 410.

As shown in FIG. 4, query task 410 operates as a control point to the loop. Specifically, task 410 determines whether additional demand requests require simulation. When an additional demand request exists, control is returned to task 402. Thereafter, task 402, pre-planning procedure 500, task 404, and demand simulation procedure 700 are repeated for this additional demand request.

As discussed above, the demand requests are evaluated in priority order. Thus, resources 14 (see FIG. 1) are allocated to the highest priority lots first. This allows the high priority lots to receive the best resource allocation which their process flow descriptions and existing commitments will permit. As shown in FIG. 6, this allocation of high priority lots does not prohibit lower priority lots from receiving contending resource allocations prior to the allocations for higher priority lots. For example, an allocation of the oven resource illustrated in list 600 of FIG. 6 to a lower priority lot "B" in task 1204 (see FIG. 12) may occur earlier than the allocation to lot "A". As illustrated in FIG. 6, lot "B" may require a relatively short usage of the oven at a temperature range $R_3$. A time slot between $T_2$ and $T_4$ will accommodate this need without impacting the prior commitment to lot "A". Thus, task 1204 would allocate the oven to lot "B" during time slot $T_2-T_3$ using the above-discussed procedures. Accordingly, the lower priority lot "B" may receive the oven resource before the higher priority lot "A".

In summary, the present invention provides an improved method for virtually allocating resources to lots. These virtual allocations follow complex process flow description networks which accurately and comprehensively describe a manufacturing or other environment. Thus, the resulting virtual allocations are sufficiently accurate so that the actual allocations within the environment closely mimic them. Moreover, the virtual allocations reflected in the processing plan which results from the method of the present invention permit efficient allocation of resources to lots. For example, the present invention implements a "soft" lot prioritization scheme which, in certain circumstances, permits resources in contention to be allocated to lower priority lots before being allocated to higher priority lots. In such circumstances the higher priority lots are not impeded by the prior allocation of resources to a lower priority lot.

Additionally, the present invention permits a dichotomy when classifying resources. Realistic plans result because it recognizes different treatment within the manufacturing environment between static and dynamic resources. Furthermore, the present invention simulates the environment in a forward-looking fashion. Multiple alternate sub-flow paths are evaluated, and a sub-flow path which best meets organizational goals, as expressed by branching rules, is selected for inclusion in the resulting processing plan.

The present invention has been described above with reference to a preferred embodiment. However, those skilled in the art will recognize that changes and modifications may be made in this preferred embodiment without departing from the scope of the present invention. For example, the above-described memory structures, descriptions, or lists may include additional data elements which further help improve the accuracy of virtual allocations and the control of actual allocations. Moreover, the specific modules, procedures, and tasks, and their relationships to one another, described above may be substantially altered by those skilled in the art to achieve substantially the same functions. For example, task 404 may initialize resource commitments on an as-needed basis during evaluate process procedure 1200 rather than in a batch fashion prior to beginning simulations. These and other changes and modifications which are obvious to those skilled in the art are intended to be included within the scope of the present invention.

What is claimed is:

1. A method for allocating a multiplicity of organizational resources to a plurality of organizational lots to accomplish organizational goals, said method comprising the steps of:
   forming a list which identifies time-valued commitments to future uses of said resources by a first portion of said lots;
   identifying one of said lots not included within said first portion of said lots, said one lot having a demand for said resources which is defined by instructions presented in a process flow description associated with said one lot;
   obtaining said process flow description;
   simulating allocation of said resources to said lot in accordance with said demand and said process flow description instructions, said simulated allocations refraining from interfering with said commitments identified in said list; and
   modifying said list to reflect commitments to said one lot.

2. A method as claimed in claim 1 additionally comprising the step of repeating said identifying, obtaining, simulating, and modifying steps for additional ones of said lots, said additional ones not being included within said first portion of lots.

3. A method as claimed in claim 1 additionally comprising, after said obtaining step, the step of executing instructions included within said process flow description with respect to said demand and without regard to said list, said executing step operating to reduce processing requirements of said simulating step.

4. A method as claimed in claim 1 wherein said process flow description includes data describing a resource consumed in a process and data describing an estimated duration for an activity performed during said process, said simulating step, and said modifying step comprise the steps of:
   obtaining, from said list, data describing at time slot during which said consumed resource is available for use;
   obtaining, from said process flow description, said duration data;
   calculating an exit time from said process as being no earlier than said the beginning of said time slot plus said duration; and
   modifying said list to reflect commitments to said one lot, said commitments comprising said consumed resource, said time slot and said exit time.

5. A method as claimed in claim 4 wherein said process flow description includes data describing a second resource consumed in a second process said second process occurring immediately subsequent to said process, and data describing an estimated duration for a second activity performed by said second process, and wherein said steps of simulating and modifying further comprise the steps of:
   obtaining, from said list, data describing a second time slot during which said consumed second resource is available for use, said second time slot occurring after said exit time;
   obtaining, from said process flow description, said duration data for said second process;
   calculating a second exit time from said second process as being not earlier than the beginning of said second time slot plus said second process duration; and modifying said list to reflect commitments to said one lot, said commitments comprising said consumed second resource, said time slot and said second exit time.

6. A method as claimed in claim 4 wherein:
said process entity is positioned within said process flow description between first and second branch nodes, said first and second branch nodes specifying first and second ones, respectively, of said instructions; and
said simulating step further comprises the step of identifying, prior to said obtaining and calculating steps, said first and second branch nodes.

7. A method as claimed in claim 6 wherein a second process entity is positioned within said process flow description between said first branch node and a third branch node, said second process entity having data describing a second resource consumed in a second process characterized by said second process entity, and said second process entity having data describing an estimated duration for a second activity performed by said second process, and said simulating step additionally comprises the steps of:
identifying said third branch node;
obtaining, from said list, data describing a second time slot during which said consumed second resource is available for use;
obtaining, from said process flow description, said duration data for said second process; and
calculating an exit time from said second process as being no earlier than the beginning of said second time slot plus said second process duration.

8. A method as claimed in claim 7 wherein said first branch node includes data describing an instruction for determining lot quantities upon which said process and said second process operate, and said simulating step additionally comprises the steps of:
calculating, prior to said obtaining data describing a time slot step, a first lot quantity for use in connection with said process; and
calculating, prior to said obtaining data describing a second time slot step, a second lot quantity for use in connection with said second process.

9. A method for translating a process flow network, which provides instructions for allocating organizational resources to organizational activities, into accomplished organizational goals, said method comprising the steps of:
associating a branch selection rule with a first decision node of said process flow network;
initiating a processing plan;
identifying first and second branch paths of said process flow network, each of said first and second branch paths being coupled to and positioned subsequent to said first node within said process flow network, and each of said first and second branch paths specifying changes in resource allocations;
simulating resource allocation changes in accordance said first and second branch paths to produce first and second subordinate processing plans, respectively;
applying said branch selection rule to said first and second subordinate processing plans to select one of said first and second subordinate processing plans for use in accomplishing said organizational goals;
modifying said processing plan to include said selected subordinate processing plan therein; and
realizing said organizational activities generally in accordance with said processing plan.

10. A method as claimed in claim 9, wherein:
said associating step additionally associates a second branch selection rule with said first decision node, said second branch selection rule having a third branch path associated therewith; and
said initiating step comprises the step of evaluating said second branch selection rule to remove said third branch path from said process flow network so that processing requirements of said identifying and simulating steps are reduced.

11. A method as claimed in claim 9 wherein said identifying step comprises the steps of:
identifying a second decision node, said second decision node serving to terminate said first branch path; and
identifying a third decision node, said third decision node serving to terminate said second branch path.

12. A method as claimed in claim 11 wherein said applying step produces a selected one of said second and third decision nodes, said selected decision node having a branch selection rule associated therewith, and said method additionally comprises the steps of:
identifying third and fourth branch paths of said process flow network, each of said third and fourth branch paths being coupled to and positioned subsequent to said selected decision node within said process flow network, and each of said third and fourth branch paths specifying changes in resource allocations;
simulating resource allocation changes in accordance said third and fourth branch paths to produce third and fourth subordinate processing plans, respectively; and
applying said branch selection rule of said selected decision node to said third and fourth subordinate processing plans to select one of said third and fourth subordinate processing plans for use in accomplishing said organizational goals.

13. A method as claimed in claim 9 additionally comprising, prior to said simulating step, the step of forming a list which identifies time-valued commitments to future uses of said resources, and wherein said simulating step comprises the step of obtaining, from said list, data describing time slots during which said resources are available for use.

14. A method for allocating a commonly used organizational resource to two competing organizational lots to accomplish organizational goals, said method comprising the steps of:
forming a list which identifies time-valued commitments to future uses of said resource;
identifying a first one of said lots and a first process flow description which provides a first set of instructions for utilizing said resource in connection with said first lot;
modifying said list to indicate a commitment to future usage of said resource by said first lot;
identifying a second one of said lots and a second process flow description, said second lot having a lower priority associated therewith than said first lot, and said second process flow description providing instructions for utilizing said resource in connection with said second lot;
modifying said list to indicate a commitment to future usage of said resource by said second lot, said second lot commitment being compatible with existing commitments identified by said list; and realizing said first and second lots generally in accordance with said commitments recorded in said list.

15. A method as claimed in claim 14 wherein:

said first process flow description includes first, second, and third decision nodes, a first branch path coupled between said first and second nodes, and a second branch path coupled between said first and third nodes;

said first set of instructions is associated with said first node; and said method additionally comprises the steps of:

simulating allocation of said resource in accordance said first and second branch paths to produce first and second subordinate processing plans, respectively; and applying said first set of instructions to said first and second subordinate processing plans to select one of said first and second subordinate processing plans for use in accomplishing said organizational goals.

16. A method as claimed in claim 15 wherein:

a branch selection rule is associated with said first decision node, said branch selection rule having a third branch path associated therewith; and said method additionally comprises the step of evaluating said branch selection rule prior to said simulating step to remove said third branch path from said process flow network so that processing requirements of said simulating step are reduced.

17. A method as claimed in claim 15 wherein said applying step produces a selected one of said second and third decision nodes, said selected decision node having a third set of instructions associated therewith, and said first process flow description additionally includes third and fourth branch paths of said process flow network, each of said third and fourth branch paths being coupled to and positioned subsequent to said selected decision node within said first process flow network, and said method additionally comprises the steps of:

simulating allocation of said resource in accordance said third and fourth branch paths to produce third and fourth subordinate processing plans, respectively; and applying said third set of instructions to said third and fourth subordinate processing plans to select one of said third and fourth subordinate processing plans for use in accomplishing said organizational goals.

18. An apparatus produced using the method of claim 1.

* * * * *

UNITED STATES PATENT AND TRADEMARK OFFICE
CERTIFICATE OF CORRECTION

PATENT NO. : 5,255,181

DATED : October 19, 1993

INVENTOR(S) : William Chapman et al

It is certified that error appears in the above-identified patent and that said Letters Patent is hereby corrected as shown below:

Column 26, claim 5, line 66, delete the word "not" and insert --no--.

Signed and Sealed this

Twenty-fourth Day of May, 1994

Attest:

BRUCE LEHMAN

*Attesting Officer*     *Commissioner of Patents and Trademarks*